(12) United States Patent
Lee et al.

(10) Patent No.: US 12,020,195 B2
(45) Date of Patent: Jun. 25, 2024

(54) SYSTEMS FOR GENERATING INTERACTIVE REPORTS

(71) Applicant: Adobe Inc., San Jose, CA (US)

(72) Inventors: Sana Malik Lee, Brea, CA (US); Zhuohao Zhang, Urbana, IL (US); Zhicheng Liu, Clarksville, MD (US); Tak Yeon Lee, DaeJeon-si (KR); Shunan Guo, San Jose, CA (US); Ryan A. Rossi, San Jose, CA (US); Fan Du, Milpitas, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 388 days.

(21) Appl. No.: 17/474,188

(22) Filed: Sep. 14, 2021

(65) Prior Publication Data

US 2023/0077829 A1 Mar. 16, 2023

(51) Int. Cl.
*G06T 11/60* (2006.01)
*G06N 20/00* (2019.01)
*G06Q 10/0639* (2023.01)
*G06T 11/20* (2006.01)

(52) U.S. Cl.
CPC ......... *G06Q 10/0639* (2013.01); *G06N 20/00* (2019.01); *G06T 11/206* (2013.01); *G06T 11/60* (2013.01)

(58) Field of Classification Search
CPC .. G06Q 10/0639; G06N 20/00; G06N 3/0464; G06T 11/206; G06T 11/60
See application file for complete search history.

(56) References Cited

U.S. PATENT DOCUMENTS

| 11,579,868 B1* | 2/2023 | Zhang | G06F 8/72 |
| 2014/0372427 A1* | 12/2014 | Lehmann | G06F 16/583 |
| | | | 707/736 |
| 2019/0042212 A1* | 2/2019 | Kandogan | G06F 8/38 |

OTHER PUBLICATIONS

Jeffrey Heer and Michael Bostock, "Declarative Language Design for Interactive Visualization", IEEE Transactions on Visualization and Computer Graphics, vol. 16, No. 6, Nov./Dec. 2010, pp. 1149-1156. (Year: 2010).*

"Adobe Creative Cloud", Adobe, Inc. [retrieved Jun. 22, 2021] Retrieved from the Internet <https://www.adobe.com/creativecloud.html>., Oct. 2011, 10 Pages.

(Continued)

*Primary Examiner* — Chong Wu
(74) *Attorney, Agent, or Firm* — FIG. 1 Patents

(57) ABSTRACT

In implementations of systems for generating interactive reports, a computing device implements a report system to receive input data describing a dataset and an analytics report for the dataset that depicts a result of performing analytics on the dataset. The report system generates a declarative specification that describes the analytics report in a language that encodes data as properties of graphic objects. Editing data is received describing a user input specifying a modification to the analytics report. The report system modifies the declarative specification using the language that encodes data as properties of graphic objects based on the user input and the dataset. An interactive report is generated based on the modified declarative specification that includes the analytics report having the modification.

20 Claims, 19 Drawing Sheets

(56) References Cited

OTHER PUBLICATIONS

"Alteryx", Alteryx, Inc. [retrieved Jun. 23, 2021]. Retrieved from the Internet <https://www.alteryx.com/>., 2006, 8 Pages.

"Bring Data to Everything", Splunk Inc. [retrieved Jun. 23, 2021] Retrieved from the Internet <https://www.splunk.com/en_us/enterprise-data-platform.html>., Feb. 2019, 4 Pages.

"Data Visualization Microsoft Power BI", Microsoft [retrieved Jun. 23, 2021] Retrieved from the Internet <https://powerbi.microsoft.com/en-us/>., 2011, 13 Pages.

"Gregor Aisch", Vimeo uploaded by Information+ Conference [online][retrieved Sep. 22, 2021]. Retrieved from the Internet <https://vimeo.com/182590214>., Sep. 13, 2016, 2 Pages.

"Office 365 is now Microsoft 365", Microsoft [online][retrieved Sep. 21, 2021]. Retrieved from the Internet <https://www.microsoft.com/en-us/microsoft-365/office-365>., Apr. 2020, 4 pages.

"Piktochart", Piktochart [retrieved Sep. 22, 2021]. Retrieved from the Internet <https://piktochart.com/>., Mar. 2012, 18 Pages.

"Quadrigram", Quadrigram [retrieved Sep. 22, 2021]. Retrieved from the Internet <https://www.quadrigram.com/>., 2005, 5 Pages.

"SAS Visual Analytics", SAS Institute Inc. [retrieved Jun. 23, 2021] Retrieved from the Internet <https://www.sas.com/en_us/software/visual-analytics.html>., Mar. 2012, 8 Pages.

"Sisense", Sisense Inc. [retrieved Sep. 22, 2021] Retrieved from the Internet <https://www.sisense.com/product/business-teams/>., Feb. 2021, 12 Pages.

"Stata: Software for Statistics and Data Science", StataCorp LLC [retrieved Jun. 23, 2021]. Retrieved from the Internet <https://www.stata.com/>., 1985, 3 Pages.

"Stories—Tableau", Tableau Software LLC [retrieved Jun. 23, 2021]. Retrieved from the Internet <https://help.tableau.com/current/pro/desktop/en-us/stories.htm>., 2014, 2 Pages.

"Vega-Lite Ecosystem", UW Interactive Data Lab [online][retrieved Sep. 20, 2021]. Retrieved from the Internet <https://vega.github.io/vega-lite/ecosystem.html>., Jun. 2015, 6 pages.

Alspaugh, Sara et al., "Futzing and Moseying: Interviews with Professional Data Analysts on Exploration Practices", IEEE Transactions on Visualization and Computer Graphics, vol. 25, No. 1 [retrieved Jun. 21, 2021]. Retrieved from the Internet <https://escholarship.org/uc/item/04g0z5gn>., Aug. 20, 2018, 11 pages.

Baur, Dominikus, "The death of interactive infographics?", Medium Blog [online][Retrieved Jun. 21, 2021]. Retrieved from the internet <https://medium.com/@dominikus/the-end-of-interactive-visualizations-52c585dcafcb>., Mar. 13, 2017, 22 pages.

Bostock, Michael et al., "$D^3$ Data-Driven Documents", IEEE Transactions on Visualization and Computer Graphics vol. 17, No. 12 [Retrieved Jun. 21, 2021]. Retrieved from the internet <http://idl.cs.washington.edu/files/2011-D3-InfoVis.pdf>., Nov. 3, 2011, 9 pages.

Boy, Jeremy et al., "Storytelling in Information Visualizations: Does it Engage Users to Explore Data?", CHI '15: Proceedings of the 33rd Annual ACM Conference on Human Factors in Computing Systems [Retrieved Jun. 21, 2021]. Retrieved from the internet <https://hal.inria.fr/hal-01133595/document>., Apr. 18, 2015, 11 pages.

Boy, Jeremy et al., "Suggested Interactivity: Seeking Perceived Affordances for Information Visualization", IEEE Transactions on Visualization and Computer Graphics vol. 22, No. 1 [Retrieved Jun. 21, 2021]. Retrieved from the internet <https://hal.inria.fr/hal-01188973/document>., Aug. 12, 2015, 11 Pages.

Boyer, Brian, "How we work", NPR Visuals Blog [online][retrieved Jun. 22, 2021] Retrieved from the Internet <https://blog.apps.npr.org/2014/06/04/how-we-work.html>., Jun. 4, 2014, 11 Pages.

Callahan, Steven P. et al., "VisTrails: visualization meets data management", SIGMOD '06: Proceedings of the 2006 ACM SIGMOD international conference on Management of data [retrieved Jun. 22, 2021]. Retrieved from the Internet <https://citeseerx.ist.psu.edu/viewdoc/download?doi=10.1.1.436.6080&rep=rep1&type=pdf>., Jun. 27, 2006, 3 Pages.

Chin, George et al., "Exploring the analytical processes of intelligence analysts", CHI '09: Proceedings of the SIGCHI Conference on Human Factors in Computing Systems [retrieved Jun. 23, 2021]. Retrieved from the internet <https://wiki.sfu.ca/research/visualanalytics/images/0/06/P11-chin.pdf>., Apr. 4, 2009, 10 Pages.

Conlen, Matthew et al., "Idyll: A Markup Language for Authoring and Publishing Interactive Articles on the Web", UIST '18: Proceedings of the 31st Annual ACM Symposium on User Interface Software and Technology [retrieved Jun. 22, 2021]. Retrieved from the internet <http://idl.cs.washington.edu/files/2018-Idyll-UIST.pdf>., Oct. 11, 2018, 13 Pages.

Deardorff, Ariel, "Tableau (version 9.1)", Journal of the Medical Library Association, vol. 104, No. 2 [retrieved Jun. 21, 2021]. Retrieved from the Internet <http://jmla.mlanet.org/ojs/jmla/article/view/75/97>., Apr. 2016, 2 pages.

Fisher, Danyel et al., "Interactions with big data analytics", Interactions vol. 19 No. 3 [retrieved Jun. 22, 2021]. Retrieved from the Internet <chttps://www.microsoft.com/en-us/research/wp-content/uploads/2016/02/inteactions_big_data.pdf>., May 1, 2012, 10 Pages.

Fulda, Johanna et al., "TimeLineCurator: Interactive Authoring of Visual Timelines from Unstructured Text", IEEE Transactions on Visualization and Computer Graphics, vol. 22, No. 1 [Jun. 22, retrieved 2021]. Retrieved from the internet <http://www.cs.ubc.ca/group/infovis/software/TimeLineCurator/tlc-vast-2015.pdf>., Aug. 12, 2015, 10 Pages.

Gotz, David et al., "Characterizing users' visual analytic activity for insight provenance", Information Visualization, vol. 8, No. 1 [retrieved Jun. 22, 2021]. Retrieved from the Internet <https://vaclab.unc.edu/publication/iv_2009_gotz/iv_2009_gotz.pdf>., Jan. 21, 2009, 14 Pages.

Gruber, John, "Markdown", Daring Fireball [online][Retrieved Jun. 22, 2021]. Retrieved from internet <https://daringfireball.net/projects/markdown/>., Dec. 17, 2004, 5 Pages.

Heer, Jeffrey et al., "Graphical Histories for Visualization: Supporting Analysis, Communication, and Evaluation", IEEE Transactions on Visualization and Computer Graphics vol. 14, No. 6 [retrieved Jun. 22, 2021]. Retrieved from the Internet <https://research.tableausoftware.com/sites/default/files/2008-GraphicalHistories-InfoVis.pdf>., Oct. 24, 2008, 8 Pages.

Hoffswell, Jane et al., "Techniques for Flexible Responsive Visualization Design", CHI '20: Proceedings of the 2020 CHI Conference on Human Factors in Computing Systems [retrieved Jun. 22, 2021]. Retrieved from the Internet <https://www.zcliu.org/responsiveVis/responsive_vis_CHI20.pdf>., Apr. 21, 2020, 13 Pages.

Hullman, Jessica et al., "Visualization Rhetoric: Framing Effects in Narrative Visualization", IEEE Transactions on Visualization and Computer Graphics vol. 17, No. 12 [retrieved Jun. 23, 2021]. Retrieved from the Internet <https://mucollective.northwestern.edu/files/2011-VisRhetoric-InfoVis.pdf>., Nov. 3, 2011, 10 Pages.

Kandel, Sean et al., "Enterprise Data Analysis and Visualization: An Interview Study", IEEE Transactions on Visualization and Computer Graphics, vol. 18, No. 12 [retrieved Jun. 22, 2021]. Retrieved from the Internet <https://dsf.berkeley.edu/papers/vast12-interview.pdf>., Oct. 9, 2012, 10 Pages.

Kandel, Sean et al., "Research directions in data wrangling: visuatizations and transformations for usable and credible data", Information Visualization, vol. 10, No. 4 [retrieved Jun. 22, 2021]. Retrieved from the Internet <http://www.cs.umd.edu/hcil/trs/2011-34/2011-34.pdf>., Sep. 2, 2011, 18 Pages.

Kang, Youn-Ah et al., "Characterizing the intelligence analysis process: Informing visual analytics design through a longitudinal field study", 2011 IEEE Conference on Visual Analytics Science and Technology (VAST) [retrieved Jun. 22, 2021]. Retrieved from the Internet <https://www.cc.gatech.edu/~stasko/papers/vast11-intell.pdf>., Oct. 2011, 10 Pages.

Kery, Mary Beth et al., "The Story in the Notebook: Exploratory Data Science using a Literate Programming Tool", CHI '18: Proceedings of the 2018 CHI Conference on Human Factors in Computing Systems [retrieved Jun. 22, 2021]. Retrieved from the Internet <http://acm.mementodepot.org/pubs/proceedings/acmconferences_3173574/3173574/3173574.3173748/31 73574.3173748.pdf>., Apr. 19, 2018, 11 pages.

Kosara, Robert et al., "Storytelling: The Next Step for Visualization", Computer, vol. 46, No. 5 [retrieved Jun. 22, 2021]. Retrieved

(56) References Cited

OTHER PUBLICATIONS from the Internet <http://highvizability.com/files/Kosara_Computer_2013.pdf>., Jan. 15, 2013, 12 Pages.

Kwon, Bum Chul et al., "Visual analytic roadblocks for novice investigators", 2011 IEEE Conference on Visual Analytics Science and Technology (VAST) [retrieved Jun. 21, 2021]. Retrieved from the Internet <https://www.bckwon.com/pdf/roadblock.pdf>., Oct. 2011, 9 Pages.

Lee, Bongshin et al., "More Than Telling a Story: Transforming Data into Visually Shared Stories", IEEE Computer Graphics and Applications, vol. 35, No. 5 [retrieved Jun. 22, 2021]. Retrieved from the Internet <https://www.microsoft.com/en-us/research/uploads/prod/2016/12/StorytellingProcess-CGA2015.pdf>., Sep. 23, 2015, 7 Pages.

Lee, Bongshin et al., "SketchStory: Telling More Engaging Stories with Data through Freeform Sketching", IEEE Transactions on Visualization and Computer Graphics, vol. 19, No. 12 [retrieved Jun. 21, 2021]. Retrieved from the internet <http://www.cs.ucf.edu/courses/cap6105/fall2013/readings/Lee2013.pdf>., Oct. 16, 2013, 10 pages.

Lindamood, Wesley, "Take our playbook: NPR's guide to building immersive storytelling projects", NPR [online][retrieved Jun. 22, 2021]. Retrieved from Internet <https://training.npr.org/2018/06/25/take-our-playbook-nprs-guide-to-building-immersive-storytelling-projects/>., Jun. 25, 2018, 5 pages.

Mathisen, Andreas et al., "InsideInsights: Integrating Data-Driven Reporting in Collaborative Visual Analytics", Computer Graphics Forum, vol. 38, No. 3 [retrieved Jun. 22, 2021]. Retrieved from the Internet <https://www.imld.de/cnt/uploads/Mathisen-InsideInsights-EuroVis-2019.pdf>., Jul. 10, 2019, 13 Pages.

McKenna, S. et al., "Visual Narrative Flow: Exploring Factors Shaping Data Visualization Story Reading Experiences", Computer Graphics Forum, vol. 36, No. 3 [retrieved Jun. 22, 2021]. Retrieved from the Internet <https://www.microsoft.com/en-us/research/wp-content/uploads/2017/08/VisualNarrativeFlow-EuroVis2017.pdf>., Jul. 4, 2017, 11 Pages.

Ottley, Alvitta et al., "The Curious Case of Combining Text and Visualization", EuroVis (Short Papers) [retrieved Jul. 23, 2021]. Retrieved from the Internet <https://diglib.eg.org/bitstream/handle/10.2312/evs20191181/121-125.pdf?sequence=1&isAllowed=y>., 2019, 5 pages.

Pirolli, Peter et al., "The sensemaking process and leverage points for analyst technology as identified through cognitive task analysis", Retrieved Jun. 22, 2021. Retrieved from the Internet <https://www.e-education.psu.edu/geog885/sites/www.e-education.psu.edu.geog885/files/geog885q/file/Lesson_02/Sense_Making_206_Camera_Ready_Paper.pdf>., Jan. 2005, 6 Pages.

Puri, Jyoti et al., "react-draft-wysiwyg", GitHub, Inc. [online][retrieved Jun. 22, 2021]. Retrieved from the Internet <https://github.com/jpuri/react-draft-wysiwyg>., Sep. 2016, 5 Pages.

Romat, Hugo et al., "ActiveInk: (Th)Inking with Data", CHI '19: Proceedings of the 2019 CHI Conference on Human Factors in Computing Systems [retrieved Jun. 22, 2021]. Retrieved from the Internet <https://hal.archives-ouvertes.fr/hal-02020272/document>., May 2, 2019, 14 Pages.

Rule, Adam et al., "Exploration and Explanation in Computational Notebooks", CHI '18: Proceedings of the 2018 CHI Conference on Human Factors in Computing Systems [retrieved Jun. 22, 2021]. Retrieved from the Internet <http://acm.mementodepot.org/pubs/proceedings/acmconferences_3173574/3173574/3173574.3173606/3173574.3173606.pdf>., Apr. 19, 2018, 12 Pages.

Russell, Daniel M. et al., "The cost structure of sensemaking", CHI '93: Proceedings of the INTERACT '93 and CHI '93 Conference on Human Factors in Computing Systems [retrieved Jun. 22, 2021]. Retrieved from the Internet <https://www.markstefik.com/wp-content/uploads/2014/04/1993-Cost-Structure-of-Sensemaking.pdf>., May 1, 1993, 8 Pages.

Satyanarayan, Arvind et al., "Authoring narrative visualizations with Ellipsis", EuroVis '14: Proceedings of the 16th Eurographics Conference on Visualization [retrieved Jun. 22, 2021]. Retrieved from the Internet <http://vis.mit.edu/pubs/ellipsis.pdf>., Jul. 12, 2014, 10 Pages.

Satyanarayan, Arvind et al., "Declarative interaction design for data visualization", UIST '14: Proceedings of the 27th annual ACM symposium on User interface software and technology [retrieved Jun. 22, 2021]. Retrieved from the Internet <http://vis.mit.edu/pubs/reactive-vega-model.pdf>., Oct. 5, 2014, 10 Pages.

Satyanarayan, Arvind et al., "Lyra: An Interactive Visualization Design Environment", In Computer Graphics Forum, vol. 33, No. 3 [Jun. 22, retrieved 2021]. Retrieved from the internet <http://citeseerx.ist.psu.edu/viewdoc/download?doi=10.1.1.691.3577&rep=rep1&type=pdf>., Jul. 12, 2014, 10 pages.

Satyanarayan, Arvind et al., "Reactive Vega: A Streaming Dataflow Architecture for Declarative Interactive Visualization", IEEE Transactions on Visualization and Computer Graphics, vol. 22, No. 1 [retrieved Jul. 23, 2021]. Retrieved from the Internet <http://idl.cs.washington.edu/files/2015-ReactiveVega-InfoVis.pdf>., Aug. 12, 2015, 10 pages.

Satyanarayan, Arvind et al., "The Lyra Visualization Design Environment (VDE) beta", UW Interactive Data Lab Projects [online][retrieved Jun. 21, 2021]. Retrieved from the Internet <http://idl.cs.washington.edu/projects/lyra/>., Feb. 28, 2014, 3 pages.

Satyanarayan, Arvind et al., "Vega-Lite: A Grammar of Interactive Graphics", IEEE Transactions on Visualization and Computer Graphics, vol. 23, No. 1 [retrieved Jun. 22, 2022] Retrieved from the Internet <https://idl.cs.washington.edu/files/2017-VegaLite-InfoVis.pdf>., Aug. 10, 2016, 10 Pages.

Sedlmair, Michael et al., "Evaluating information visualization in large companies: challenges, experiences and recommendations", BELIV '10: Proceedings of the 3rd BELIV'10 Workshop: BEyond time and errors: novel evaluation methods for Information Visualization [retrieved Jun. 22, 2021]. Retrieved from the Internet <https://aviz.fr/wiki/uploads/Research/Sedlmair_2010_EIV.pdf>., Apr. 10, 2010, 8 Pages.

Segel, Edward et al., "Narrative Visualization: Telling Stories with Data", IEEE Transactions on Visualization and Computer Graphics, vol. 16, No. 6 [retrieved Jun. 22, 2021]. Retrieved from the Internet <http://vis.stanford.edu/files/2010-Narrative-InfoVis.pdf>., Oct. 28, 2010, 10 Pages.

Stolper, Charles et al., "Emerging and Recurring Data-Driven Storytelling Techniques: Analysis of a Curated Collection of Recent Stories", Microsoft Research [online][retrieved Jun. 22, 2021]. Retrieved from the Internet <https://www.microsoft.com/en-us/research/wp-content/uploads/2016/04/MSR-TR-2016-14-Storytelling-Techniques.pdf>., Apr. 2016, 14 Pages.

Strickland, Michael et al., "ArchieML", The New York Times Company [retrieved Jun. 22, 2021] Retrieved from the Internet <http://archieml.org/>., Mar. 2015, 14 Pages.

Wongsuphasawat, Kanit et al., "Voyager 2: Augmenting Visual Analysis with Partial View Specifications", CHI '17: Proceedings of the 2017 CHI Conference on Human Factors in Computing Systems [retrieved Jun. 23, 2021]. Retrieved from the Internet <https://faculty.washington.edu/billhowe/publications/pdfs/wongsuphasawat17voyager2.pdf>., May 2, 2017, 12 Pages.

Wongsuphasawat, Kanit et al., "Voyager: Exploratory Analysis via Faceted Browsing of Visualization Recommendations", IEEE Transactions on Visualization and Computer Graphics, vol. 22, No. 1 [retrieved Jun. 21, 2021]. Retrieved from the Internet <https://idl.cs.washington.edu/files/2015-Voyager-InfoVis.pdf>., Aug. 12, 2015, 10 pages.

Wongsuphasawat, Krist et al., "Convert Vega spec into React class conveniently", GitHub, Inc., Vega [online][retrieved Sep. 22, 2021]. Retrieved from the Internet <https://github.com/vega/react-vega>., Oct. 9, 2020, 2 Pages.

Wood, Brian, "Adobe InDesign: Create an interactive PDF", Adobe Inc. [retrieved Sep. 22, 2021]. Retrieved from the Internet <https://helpx.adobe.com/indesign/how-to/indesign-create-interactive-pdf.html>., Dec. 9, 2020, 4 Pages.

Zhi, Qiyu et al., "Linking and Layout: Exploring the Integration of Text and Visualization in Storytelling", Computer Graphics Forum

(56) References Cited

OTHER PUBLICATIONS vol. 38, No. 3, [retrieved Jun. 23, 2021]. Retrieved from the Internet <https://doi.org/10.1111/cgf.13719>., Jul. 10, 201, 11 Pages.

* cited by examiner

Fig. 3B

SYSTEMS FOR GENERATING INTERACTIVE REPORTS

BACKGROUND

Digital analytics platforms are implemented to analyze large amounts of data (e.g., petabytes of data) to gain insights that are not possible or practical to obtain solely by human users. For example, a digital analytics platform performs analytics on a dataset of more than 35 million electronic health records to identify genetic markers associated with development of a certain disease. In this example, the genetic markers are various gene sequences which are not identifiable without leveraging the digital analytics platform.

Some analytics platforms are also capable of generating analytics reports which depict results of performing analytics on a dataset. For instance, the digital analytics platform generates an analytics report depicting the identified genetic markers associated with the certain disease. However, the analytics reports generated by analytics platforms are static and convey information passively. As a result of this, it is common for analytics reports to be generated multiple times sequentially which is an inefficient use of computational resources.

In one example, an analytics platform performs analytics on a dataset and generates a first analytics report depicting a result of the performed analytics. A shortcoming of the first analytics report is identified. For example, the first analytics report includes some data which is not relevant, does not include some data which is relevant, displays data in a layout which is not aesthetically pleasing, and so forth.

To resolve the shortcoming of the first analytics report, the analytics platform performs the analytics on the dataset again and generates a second analytics report using additional computational resources. The second analytics report depicts a modified result of the reperformed analytics. A shortcoming of the second analytics report is then identified, and the analytics platform performs the analytics on the dataset again to generate an additional analytics report. This sequence of generation and regeneration of the analytics reports only ends when a particular analytics report is generated without any identifiable shortcomings which is computationally inefficient.

SUMMARY

Techniques and systems are described for generating interactive reports. In an example, a computing device implements a report system to receive input data describing a dataset and an analytics report for the dataset that depicts a result of analytics performed on the dataset. The report system generates a declarative specification that describes the analytics report in a language that encodes data as properties of graphic objects.

For example, editing data is received describing a user input specifying a modification to the analytics report. The report system modifies the declarative specification using the language that encodes data as properties of graphic objects based on the user input and the dataset. The report system then generates an interactive report based on the modified declarative specification that includes the analytics report having the modification.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, and 3C illustrate an example of generating a declarative specification describing an analytics report in a language that encodes data as properties of graphic objects.

DETAILED DESCRIPTION

Overview

Figure 1:
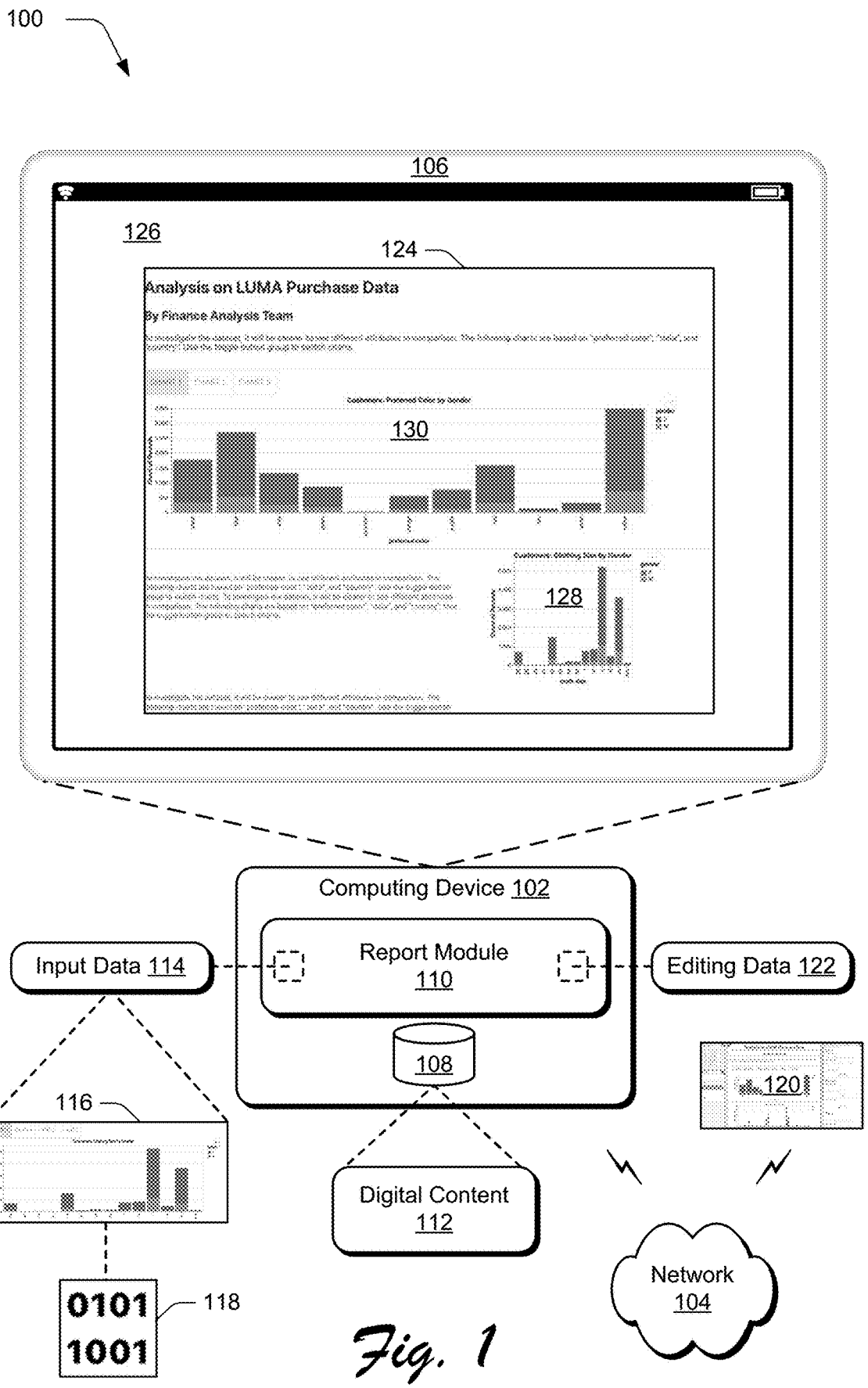
FIG. 1 is an illustration of an environment in an example implementation that is operable to employ digital systems and techniques for generating interactive reports as described herein.

Conventional analytics reports generated by analytics platforms convey analytics results statically and passively. Due to this, it is common for analytics reports to be generated multiple times sequentially. This sequence of generation and regeneration of the analytics reports only ends when a particular analytics report is generated without any identifiable shortcomings which is computationally inefficient.

In order to overcome the limitations of conventional analytics reports, techniques and systems are described for generating interactive reports. In one example, a computing device implements a report system to receive input data describing a dataset and an analytics report for the dataset that depicts a result of analytics performed on the dataset. For example, the analytics report includes multiple charts conveying portions of the result of analytics performed on the dataset.

The report system generates a declarative specification that describes the analytics report in a language that encodes data as properties of graphic objects such as Protovis, Vega, Vega-Lite, and so forth. To do so in one example, the report system processes the analytics report described by the input data using a machine learning model trained on training data to receive analytics reports and generate declarative specifications describing the analytics reports in the language that encodes data as properties of graphic objects. In this example, the machine learning model outputs the declarative specification that describes the analytics report.

In other examples, the report system generates the declarative specification by processing the analytics report described by the input data using an optical character recognition system to identify text depicted in the analytics report and pre-trained convolutional neural networks to classify features depicted in the analytics report. For instance, the report system uses the identified text, the classified features, and the dataset to generate the declarative specification that describes the analytics report. In some examples, the analytics report is formatted in format that is directly convertible into the language that encodes data as properties of graphic objects, and the report system directly converts the analytics report into the declarative specification.

Once the declarative specification is generated, the report system is capable of using the declarative specification to reproduce the analytics report and/or modifying the analytics report by modifying the declarative specification. In an example, the report system uses the declarative specification to display the analytics report or portions of the analytics report in an editing interface of a display device. In this example, a user interacts with an input device (e.g., a mouse, a keyboard, a stylus, a microphone, a touchscreen, etc.) relative to the editing interface to modify the analytics report.

The input device generates editing data describing a user input specifying a modification to the analytics report, and the report system receives the editing data. In one example, the modification is a selection of a subset of the multiple charts conveying portions of the result of analytics performed on the dataset. In other examples, the modification adds an interactive filter to a chart, adds an overlay to the chart, adds a highlight to the chart, annotates the chart, adds a tooltip to the chart, adds a digital image or a digital video to the chart, defines a layout for the chart and an additional chart, defines a grouping for the chart and the additional chart, and so forth.

The report system modifies the declarative specification using the language that encodes data as properties of graphic objects based on the user input and the dataset. For example, the editing interface is a what you see is what you get (WYSIWYG) interface. In this example, the user interacts with the input device relative to the WYSIWYG interface to specify the modification to the analytics report, and the report system modifies the declarative specification using the language that encodes data as properties of graphic objects automatically and without user intervention.

The report system then generates an interactive report based on the modified declarative specification that includes the analytics report having the modification. Unlike conventional analytics reports which are static and convey information passively, the interactive report includes interactive functionality usable to remove irrelevant data included in the interactive report, add relevant data that is not included in the interactive report, change a layout or a grouping of charts included in the interactive report, etc. These example modifications to the interactive report are performable without having to perform analytics on the dataset multiple times as in the conventional analytics reports which is computationally inefficient.

The described systems are capable of generating the interactive report in a portable format such as in a hypertext markup language (HTML) format. By generating the interactive report in this manner, the interactive report is viewable and modifiable with or without access to the dataset. In this way, the described systems further improve the conventional analytics reports that are static and convey information passively.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a report module 110. The storage device 108 is illustrated to include digital content 112. Examples of the digital content 112 include digital images depicting text, graphs, charts, and so forth. For instance, the storage device 108 is accessible to the report module 110, and the report module 110 is capable of receiving and/or transmitting data via the network 104.

The report module 110 is illustrated as having, receiving, and or transmitting input data 114. For example, the input data 114 describes an analytics report 116 and a dataset 118. The dataset 118 includes unprocessed data in this example and the analytics report 116 depicts a result of analytics performed on the dataset 118, for example, using an analytics platform. Analytics platforms are usable to process the data included in the dataset 118 to gain insights which are not possible to obtain solely by human users. Examples of analytics platforms include Tableau, Power BI, Splunk, Jupyter Notebook, and so forth.

For instance, an analytics platform is capable of identifying relationships, trends, and/or dependencies among variables described by the data included in the dataset 118. The analytics platform is also capable of generating the analytics report 116 to include indications of these identified relationships, trends, and/or dependencies. Thus, the analytics report 116 is usable to communicate insights identified via the analytics platform with respect to the data included in the dataset 118.

Consider an example in which the dataset 118 includes unprocessed data describing treatment histories for patients with a particular medical condition including characteristics of the patients and outcomes of various treatments for the particular medical condition. In this example, an analytics platform processes the data included in the dataset 118 to generate the analytics report 116. For example, the analytics report 116 depicts indications of patient characteristics and corresponding treatments that are likely to produce positive and/or negative outcomes based on the dataset 118. A physician uses the analytics report 116 to improve a treatment outcome for a particular patient with the particular medical condition even though the physician does not necessarily have knowledge of all the data included in the dataset 118.

Consider an additional example in which the dataset 118 includes unprocessed data describing characteristics of items of clothing and characteristics of entities that acquired the items of clothing In this additional example, the analytics platform processes the dataset 118 to generate the analytics report 116 which depicts indications of clothing size preferences by gender. For example, a supply chain professional uses the analytics report 116 as a guide for acquiring materials to manufacture clothing.

Although a single analytics report 116 is illustrated, it is to be appreciated that the input data 114 describes multiple analytics reports 116 depicting results of analytics performed on the dataset 118 in some examples. For example, the input data 114 describes a first analytics report 116 generated by processing the data included in the dataset 118 with a first analytics platform and the input data 114 also describes a second analytics report 116 generated by processing the data included in the dataset 118 with a second analytics platform. In this example, the first analytics report 116 is generated in a format that is not compatible with the second analytics platform and the second analytics report 116 is generated in a format that is not compatible with the first analytics platform.

The report module 110 receives and processes the input data 114 to generate a declarative specification that describes the analytics report 116. As described above, the report module 110 is capable of receiving the input data 114 in a variety of different formats including scenarios in which the input data 114 describes a first portion of the analytics report 116 in a first format and a second portion of the analytics report 116 in a second format that is not compatible with the first formant. In such scenarios, the report module 110 converts the first format and the second format into a uniform format by pre-processing the input data 114, and then generates the declarative specification using the uniform format. Examples of pre-processing the input data 114 are described in detail with respect to FIGS. 3A and 3B.

For instance, the report module 110 generates the declarative specification in a language that encodes data as properties of graphic objects such as Protovis, Vega, Vega-Lite, and so forth. Once the declarative specification is generated, the report module 110 is capable of reproducing the analytics report 116 using the declarative specification. In an example, the report module 110 is also capable of modifying the analytics report 116, e.g., by modifying the declarative specification using the language that encodes data as properties of graphic objects.

Figure 3A:
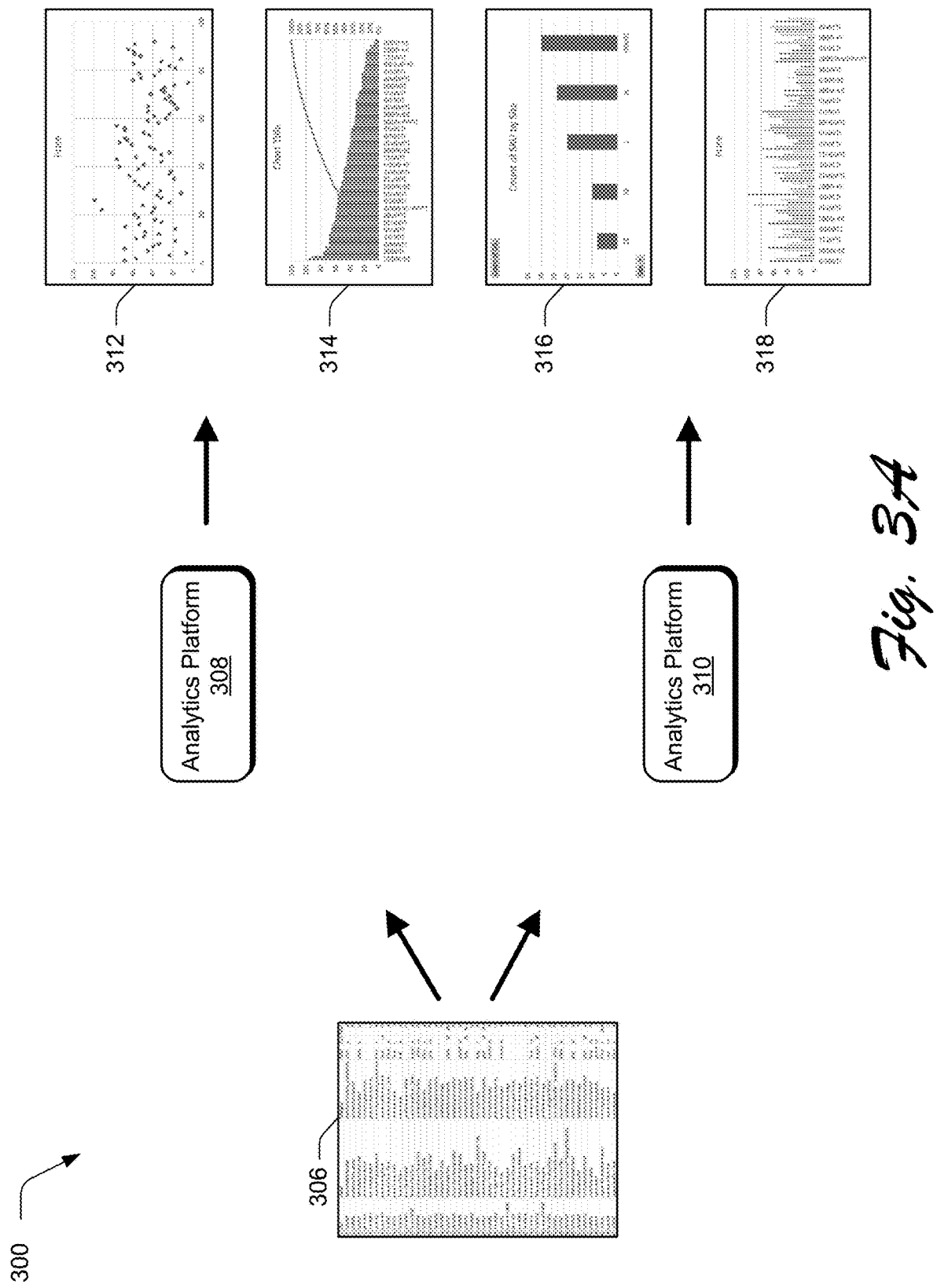
Figure 3B:
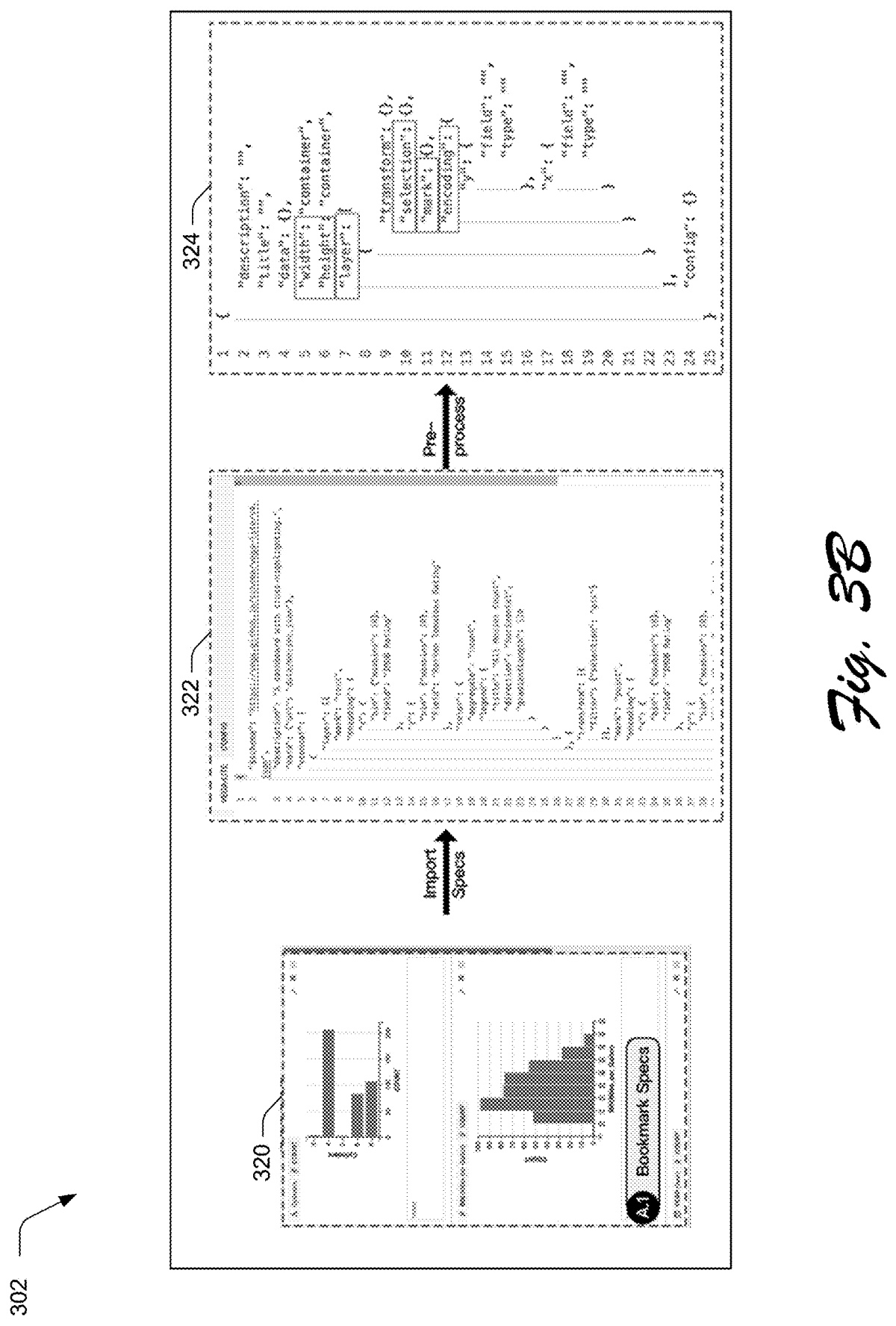
Figure 3C:
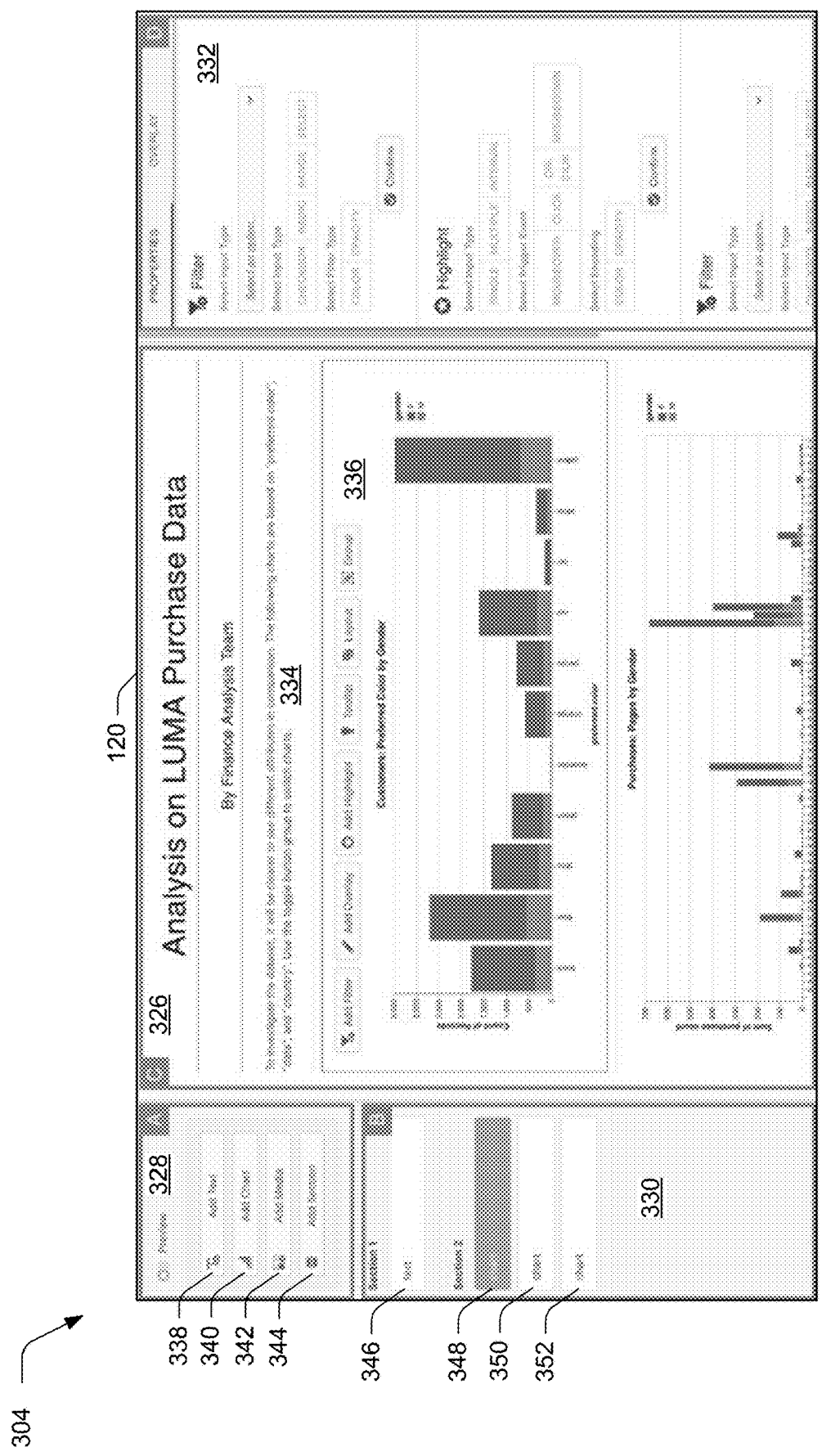

The report module 110 leverages the declarative specification to display portions of the analytics report 116 in an editing interface 120 which is described in detail with respect to FIG. 3C. In the example environment 100, the editing interface 120 is connected to the network 104 and illustrated as being separate from the display device 106. However, in some examples the editing interface 120 is an interface of the display device 106.

A user interacts with an input device (e.g., a mouse, a stylus, a touchscreen, etc.) to select and/or edit the portions of the analytics report 116 displayed in the editing interface 120, and the input device generates editing data 122 that describes these selections and/or edits. For example, the user interacts with the input device relative to the editing interface 120 to modify the analytics report 116 by annotating the analytics report 116, adding filters to the analytics report 116, changing a layout of the analytics report 116, and so forth. As the user modifies the analytics report 116, the report module 110 modifies the declarative specification using the language that encodes data as properties of graphic objects. For instance, the report module 110 automatically modifies the declarative specification based on the user's modifications to the analytics report 116 described by the editing data 122.

Consider an example in which the user interacts with the input device relative to the editing interface 120 to modify the analytics report 116 by adding an interactive filter to the analytics report 116. In this example, the report module 110 processes the input data 114 to generate the interactive filter such that an interaction with the interactive filter removes a portion of the result of analytics performed on the dataset 118 from the analytics report 116. For example, the report module 110 modifies the declarative specification to describe the analytics report 116 with the added interactive filter using the language that encodes data as properties of graphic objects.

In some examples, the user interacts with the input device relative to the editing interface 120 to perform additional analytics on the dataset 118. For instance, the analytics report 116 depicts a result of analytics performed on the dataset 118 using a first analytics platform and the user interacts with the input device to generate an additional result of the additional analytics performed on the dataset 118 using the first analytics platform or a different analytics platform. Consider an example in which the report module 110 processes the input data 114 to generate the interactive filter for the analytics report 116 such that an interaction with the interactive filter adds the additional result of the additional analytics performed on the dataset 118 to the analytics report 116. In this example, the analytics report 116 depicts a result of analytics performed for two classes of multiple classes of data included in the dataset 118 and the interaction with the interactive filter adds a result of analytics performed for a third class of the multiple classes to the analytics report 116.

Consider an additional example in which the report module 110 displays four portions of the analytics report 116 in the editing interface 120, and the user interacts with the input device to select and edit two of the four portions of the analytics report 116 displayed in the editing interface 120. In this example, the editing data 122 describes the selection of and the edits applied to the two portions of the analytics report 116. The report module 110 receives the editing data 122 and processes the editing data 122 and/or the input data 114 to generate an interactive report 124 which is rendered in a user interface 126 of the display device 106. For example, the report module 110 modifies the declarative specification based on the editing data 122 and generates the interactive report 124 based on the modified declarative specification.

As shown, the interactive report 124 includes a first chart 128 depicting indications of "Clothing Size by Gender" and a second chart 130 depicting indications of "Preferred Color by Gender." These charts 128, 130 each correspond to one the two selected and edited portions of the analytics report 116. For example, the interactive report 124 (and the charts 128, 130) reflect the edits applied to the analytics report 116 in the editing interface 120. A layout of the analytics report 116 includes a single displayed chart while a layout of the interactive report 124 includes the charts 128, 130 simultaneously displayed. In the interactive report 124, the charts 128, 130 are displayed in a manner which suggests that the second chart 130 is a primary chart and the first chart 128 is a secondary chart. This multi-chart layout is an improvement relative to the single chart displayed in the layout of analytics report 116.

Figure 2:
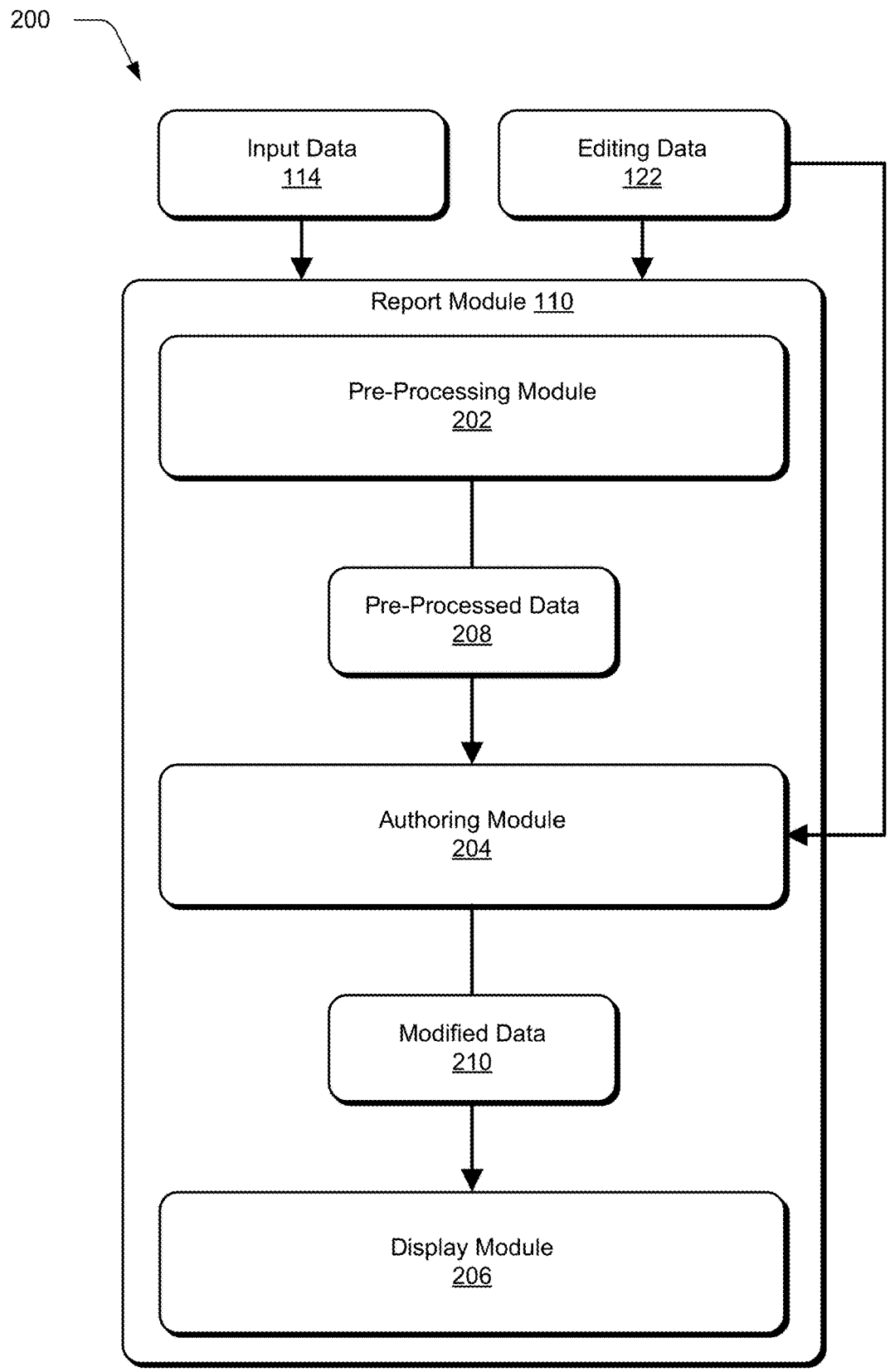
FIG. 2 depicts a system in an example implementation showing operation of a report module for generating interactive reports.

FIG. 2 depicts a system 200 in an example implementation showing operation of a report module 110. The report module 110 is illustrated to include a pre-processing module 202, an authoring module 204, and a display module 206. The report module 110 receives the input data 114 and the editing data 122 as inputs. For example, the pre-processing module 202 receives the input data 114 and processes the input data 114 to generate pre-processed data 208.

FIGS. 3A, 3B, and 3C illustrate an example of generating a declarative specification describing an analytics report in a language that encodes data as properties of graphic objects. FIG. 3A illustrates a representation 300 of generating analytics reports with analytics platforms. FIG. 3B illustrates a representation 302 of a declarative specification in the language that encodes data as properties of graphic objects. FIG. 3C illustrates a representation 304 of an editing interface 120.

As shown in FIG. 3A, the representation 300 includes a dataset 306 as well as a first analytics platform 308 and a second analytics platform 310. In the illustrated example, the dataset 306 is in a comma-separated values (CSV) format; however, in other examples the dataset 306 is formatted in other formats that are compatible with the analytics platforms 308, 310. For example, the first analytics platform 308 is Tableau, Power BI, Splunk, Excel, Jupyter Notebook, Stata, Alteryx, Periscope, etc. In an example, the second analytics platform 310 is a same analytics platform as the first analytics platform 308. In another example, the second analytics platform 310 is a different analytics platform from the first analytics platform 308.

The first analytics platform 308 processes the dataset 306 to perform analytics on the dataset 306. For instance, the first analytics platform 308 generates analytics reports 312, 314 to communicate results of performing the analytics on the dataset 306. For example, analytics report 312 depicts a first result of the analytics performed on the dataset 306 and analytics report 314 depicts a second result of the analytics performed on the dataset 306.

Consider an example in which the dataset 306 includes data describing characteristics of items of clothing and characteristics of entities that acquired the items of clothing In this example, the analytics platform 308 processes the data included in the dataset 306 to identify insights in the data as the results of performing analytics on the data included in the dataset 306. For instance, the analytics platform 308 generates the analytics report 312 as depicting indications of preferred color by gender or indications of prices by clothing size. Similarly, the analytics platform 308 generates the analytics report 314 as depicting indications of clothing size by gender or indications of catalog numbers by gender.

The second analytics platform 310 also processes the dataset 306 and performs additional analytics on the dataset 306. For example, the second analytics platform 310 generates analytics reports 316, 318 to communicate results of performing the additional analytics on the dataset 306. Analytics report 316 depicts a first result of the additional analytics performed on the dataset 306 and analytics report 318 depicts a second result of the additional analytics performed on the dataset 306. In the illustrated example, each of the analytics reports 312-318 has a different format. For example, the analytics report 312 includes a first chart type, the analytics report 314 includes a second chart type, the analytics report 316 includes a third chart type, and the analytics report 318 includes a fourth chart type.

With respect to FIG. 2, the pre-processing module 202 receives the input data 114 which describes the dataset 306 and the analytics reports 312-318. For example, the pre-processing module 202 processes the input data 114 to generate a declarative specification in a language that encodes data as properties of graphic objects for each of the analytics reports 312-318. To do so in one example, the pre-processing module 202 first determines a format of the analytics reports 312-318. In an example in which the pre-processing module 202 determines that the analytics report 312 is formatted in a format that is directly convertible to the language that encodes data as properties of graphic objects, the pre-processing module 202 generates a declarative specification that describes the analytics report 312 by converting the analytics report 312 into the language that encodes data as properties of graphic objects. In this example, the pre-processing module 202 generates the pre-processed data 208 as describing the declarative specification that describes the analytics report 312 in the language that encodes data as properties of graphic objects.

The representation 302 illustrated in FIG. 3B depicts an example in which the pre-processing module 202 determines that the format of the analytics reports 312-318 is not directly convertible to the language that encodes data as properties of graphic objects or the pre-processing module 202 is unable to determine a format of the analytics reports 312-318. As shown, the representation 302 includes an analytics report 320 which is formatted in a format that is not directly convertible into the language that encodes data as properties of graphic objects. For example, the analytics report 320 is a digital image depicting the analytics reports 312-318. In an example in which the language that encodes data as properties of graphic objects is Vega-Lite, then the analytics report 320 is formatted in a format that is not directly convertible into Vega-Lite.

The pre-processing module 202 processes the analytics report 320 to generate a partial declarative specification 322. For example, the pre-processing module 202 is capable of generating the partial declarative specification 322 using a variety of systems and techniques. In one example, the pre-processing module 202 implements an optical character recognition system to process the analytics report 320. In this example, the optical character recognition system identifies and extracts text from the analytics report 320 and the pre-processing module 202 includes the extracted text in the partial declarative specification 322.

In another example, the pre-processing module 202 implements a classification system to classify features included in the analytics report 320. In this example, the pre-processing module 202 extracts the classified features and includes the extracted features in the partial declarative specification 322. For example, the classification system includes convolutional neural networks pre-trained on training data to classify features of analytics reports. The pre-trained convolutional neural networks receive the analytics report 320 as an input and generate classifications of features included in the analytics report 320 as an output. For instance, the pre-processing module 202 includes the output classifications in the partial declarative specification 322.

The pre-processing module 202 leverages the partial declarative specification 322 and the dataset 306 to generate a declarative specification 324 describing the analytics report 320 in the language that encodes data as properties of graphic objects. In the example in which the analytics report 320 is a digital image depicting the analytics reports 312-318, the pre-processing module 202 uses the partial declarative specification 322 and the data included in the dataset 306 to generate the declarative specification 324 as describing the analytics reports 312-318 in the language that encodes data as properties of graphic objects. To do so in one example, the pre-processing module 202 performs analytics on the dataset 306 based on the partial declarative specification 322.

For example, functionality included in the analytics platforms 308, 310 is also available to the pre-processing module 202. The pre-processing module 202 is capable of implementing the analytics platforms 308, 310 to perform analytics on the dataset 306 and the pre-processing module 202 is also capable of performing analytics on the dataset 306 directly, for example, without implementing the analytics platforms 308, 310. For instance, the partial declarative specification 322 describes a result of analytics performed on the dataset 306 that is depicted in the analytics report 320, and the pre-processing module 202 performs analytics on the dataset 306 to reproduce the result of analytics depicted in the analytics report 320 as the declarative specification 324.

The pre-processing module 202 then generates the pre-processed data 208 as describing the declarative specification 324. In the example in which the analytics report 320 is the digital image depicting the analytics reports 312-318, the pre-processing module 202 uses the partial declarative specification 322 and the data included in the dataset 306 to generate a declarative specification 324 for each of the analytics reports 312-318. The pre-processing module 202 then generates the pre-processed data 208 as describing the declarative specification 324.

As illustrated in FIG. 2, the authoring module 204 receives the pre-processed data 208 and the editing data 122 and the authoring module 204 processes the pre-processed data 208 and/or the editing data 122 to generate modified data 210. In order to generate the modified data 210, the authoring module 204 processes the pre-processed data 208 to display portions of the analytics report 320 and/or the analytics reports 312-318 relative to an editing interface 120. The representation 304 depicted in FIG. 3C includes the editing interface 120.

As shown, the editing interface 120 includes a main panel 326, an editing panel 328, an overview panel 330, and a properties panel 332. A user interacts with an input device (e.g., a mouse, a stylus, a joystick, a touchscreen, a keyboard, etc.) relative to the editing interface 120 to create and edit an interactive report. For example, the user manipulates the input device to manipulate a cursor in the editing interface 120 as part of creating and editing the interactive report. The main panel 326 displays a rendering of the interactive report including editable elements of the interactive report such as a narrative text 334 and an interactive chart 336.

The editing panel 328 includes user interface elements 338-344 which are usable to add editable elements to the interactive report in one example. For example, the user interacts with the input device to interact with user interface element 338 in the editing panel 328 to add the narrative text 334 to the interactive report. In this example, the user then manipulates the input device to edit the narrative text 334 in the main panel 326. Edits to the narrative text 334 include edits to a substance of the narrative text 334 and edits to a style or a visual appearance of the narrative text 334. For instance, the user manipulates the input device relative to the main panel 326 to change a font used to render glyphs of the narrative text 334.

In an example, the user manipulates the input device to interact with user interface element 340 in the editing panel 328 to add the interactive chart 336 to the interactive report. The user then interacts with the input device to edit the interactive chart 336 in the main panel 326. Examples of edits to the interactive chart 336 include adding a filter, adding an overlay, adding a highlight, adding a tooltip, changing a layout, changing a grouping, etc.

Consider an example in which the user interacts with the input device to add multiple filters to the interactive chart 336. In this example, for each filter added to the interactive chart 336, the user specifies an attribute of the dataset 306 as a filter attribute. The user also specifies an input type from available input types such as a checkbox (e.g., Boolean values), a range (e.g., numerical values), selections, and a radio (e.g., nominal values). Finally, the user specifies a filter type of either color or opacity. This filter type defines a visual indicator for unfiltered data. For example, after the data is filtered out from the interactive chart 336, the remaining data changes in color for the filter type of color or opacity for the filter type of opacity. As the user interacts with the input device to modify the interactive chart 336, the authoring module 204 modifies the declarative specification 324 to reflect the modifications to the interactive chart 336 using the language that that encodes data as properties of graphic objects. In this example, the authoring module 204 modifies the declarative specification 324 to include a description of the added filters to the interactive chart 336.

Consider another example in which the user interacts with the input device to add an overlay to the interactive chart 336. In this example, the user interacts with tools of the editing interface 120 such as a pencil tool, a line tool, a rectangle tool, a circle tool, and selection tools to customize a visual appearance of the overlay. For example, the user interacts with the input device to specify a size of the overlay, define colors of the overlay, add annotations to the overlay, etc. As the user interacts with the input device to add the overlay to interactive chart 336, the authoring module 204 modifies the declarative specification 324 to reflect the addition of the overlay to the interactive chart 336 using the language that that encodes data as properties of graphic objects.

Consider an example in which the user interacts with the input device to add a highlight to the interactive chart 336. In this example, the user defines how the highlight is displayed by selecting types of inputs from single, multiple, and interval selection. Single and multiple inputs are displayable in response to a mouseover or click and interval inputs (e.g., area selections) are displayable via selection in the editing interface 120. As the user interacts with the input device to add the highlight to interactive chart 336, the authoring module 204 modifies the declarative specification 324 to reflect the addition of the highlight to the interactive chart 336 using the language that that encodes data as properties of graphic objects.

Consider an additional example in which the user interacts with the input device to modify a layout of the interactive chart 336 and or the interactive report. In this example, the user selects from layouts including an aside layout, a full-width layout, a fixed layout, and a float layout. The aside layout displays the interactive chart 336 alongside an additional element of the interactive report. The full-width layout is a default layout, and the full-width layout displays the additional element in a linear sequence with the interactive chart 336. The fixed layout displays the interactive chart 336 fixed to a side of the additional element and the float layout displays the interactive chart 336 based on a current position of the cursor in the editing interface 120 which changes as the user interacts with the input device. As the user interacts with the input device to modify the layout of the interactive chart 336, the authoring module 204 modifies the declarative specification 324 to reflect the modified layout of the interactive chart 336 using the language that that encodes data as properties of graphic objects.

In another example, the user interacts with the input device to modify a grouping of the interactive chart 336. In this other example, the user selects a multi-view grouping or a facet grouping for the interactive chart 336. The multi-view grouping includes the interactive chart 336 in one group of other charts which are displayable via interaction with user interface elements. The facet grouping displays subsets of data included the interactive chart 336 in the editing interface 120. For example, the authoring module 204 automatically determines how to display the subsets of data. As the user interacts with the input device to modify the grouping of the interactive chart 336, the authoring module 204 modifies the declarative specification 324 to reflect the modified grouping of the interactive chart 336 using the language that that encodes data as properties of graphic objects.

In other examples, the user manipulates the input device to interact with user interface element 342 to add media (e.g., digital images, digital videos, digital audio, etc.) to the interactive chart 336 or the interactive report. In one example, the user manipulates the input device to interact with user interface element 344 to add a section to the interactive report. For example, the user manipulates the input device to add tooltips to the interactive chart 336 or the interactive report. In this example the user selects trigger events for displaying the tooltips. As the user interacts with the input device to modify the interactive chart 336 and/or the interactive report, the authoring module 204 modifies the declarative specification 324 to include descriptions of the modifications to the interactive chart 336 and/or the interactive report.

As shown in the overview panel 330, the interactive report includes two sections. Section 1 includes user interface element 346 in the overview panel 330. The user interface element 346 represents the narrative text 334. For example, the user manipulates the input device to interact with the user interface element 346 in the editing interface 120 and moves the user interface element into Section 2 in the overview panel 330. This causes the narrative text 334 to move into Section 2 in the interactive report.

In the overview panel 330, Section 2 includes user interface elements 348-352. The user interface element 348 represents the interactive chart 336. For example, the user interacts with the user interface element 348 in the overview panel 330 and moves the user interface element 348 into Section 1 to move the interactive chart 336 into Section 1 in the interactive report. In the illustrated example, the user interacts with the input device to select the user interface element 348 in the overview panel 330. Selection of the user interface element 348 causes the authoring module 204 to display properties of the interactive chart 336 in the properties panel 332.

As previously described, the displayed properties of the interactive chart 336 include filter properties, overlay properties, highlight properties, and so forth. In this example, the user manipulates the input device to interact with the displayed properties of the interactive chart 336 in the properties panel 332 to change a type of filter, change a filter input type, change a highlight input type, change a highlight trigger event, etc. As illustrated in the representation 304, the user interacts with the input device relative to the editing interface 120 to edit the interactive report via a what you see is what you get (WYSIWYG) interface to generate the editing data 122. The authoring module 204 receives and processes the editing data 122 to translate edits to the interactive report described by the editing data 122 into the language that encodes data as properties of graphic objects.

For instance, the authoring module 204 processes the pre-processed data 208 and uses the declarative specification 324 to display portions of the analytics report 320 in the editing interface 120. In this instance, the portions of the analytics report 320 displayed in the editing interface 120 include the interactive chart 336. The authoring module 204 processes the editing data 122 and modifies the declarative specification 324 based on the editing data 122.

For example, as the user interacts with the input device to modify the interactive chart 336 via the WYSIWYG editing interface 120 by adding a filter to the interactive chart 336. The authoring module 204 receives the editing data 122 describing the addition of the filter to the interactive chart 336. Based on this addition to the interactive chart 336, the authoring module 204 modifies the declarative specification 324. For instance, the authoring module 204 modifies the declarative specification 324 to describe the added filter in the language that encodes data as properties of graphic objects. In some examples, the authoring module 204 modifies the declarative specification 324 in this way automatically and without intervention by the user.

Figure 4A:
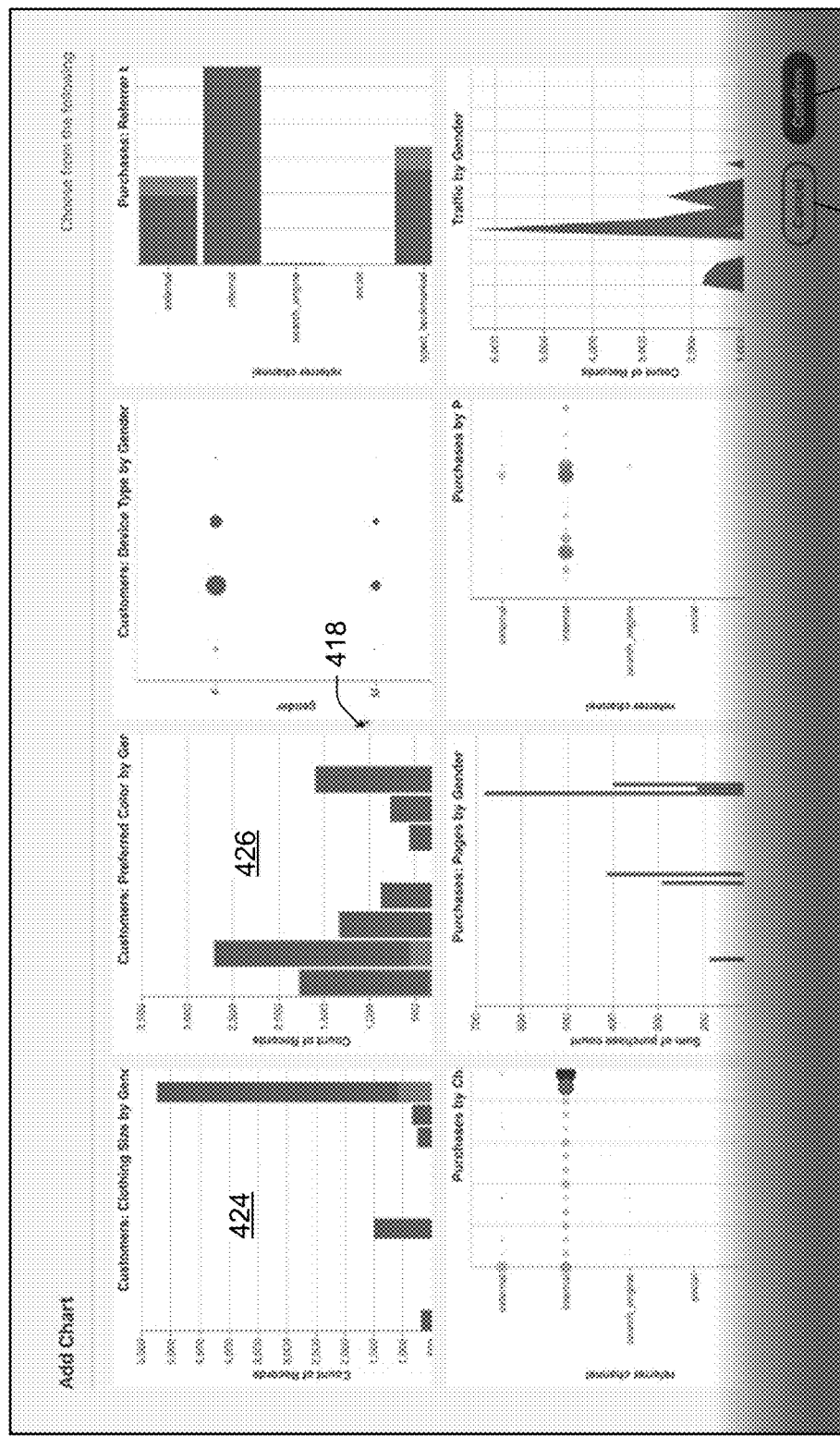
FIGS. 4A, 4B, 4C, 4D, 4E, 4F, 4G, 4H, and 4I illustrate examples of user inputs received specifying modifications to analytics reports as part of generating an interactive report.
Figure 4B:
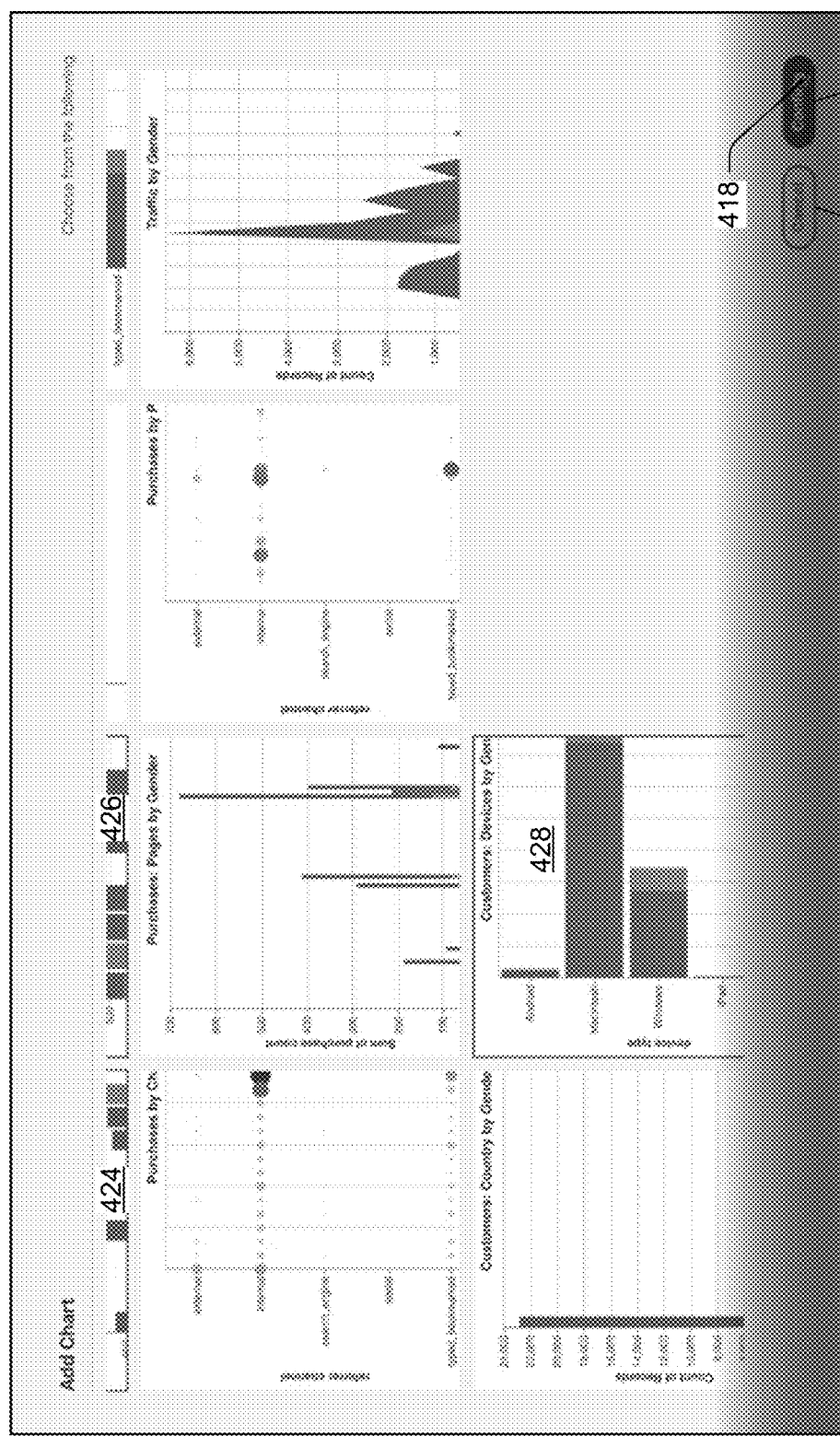
Figure 4C:
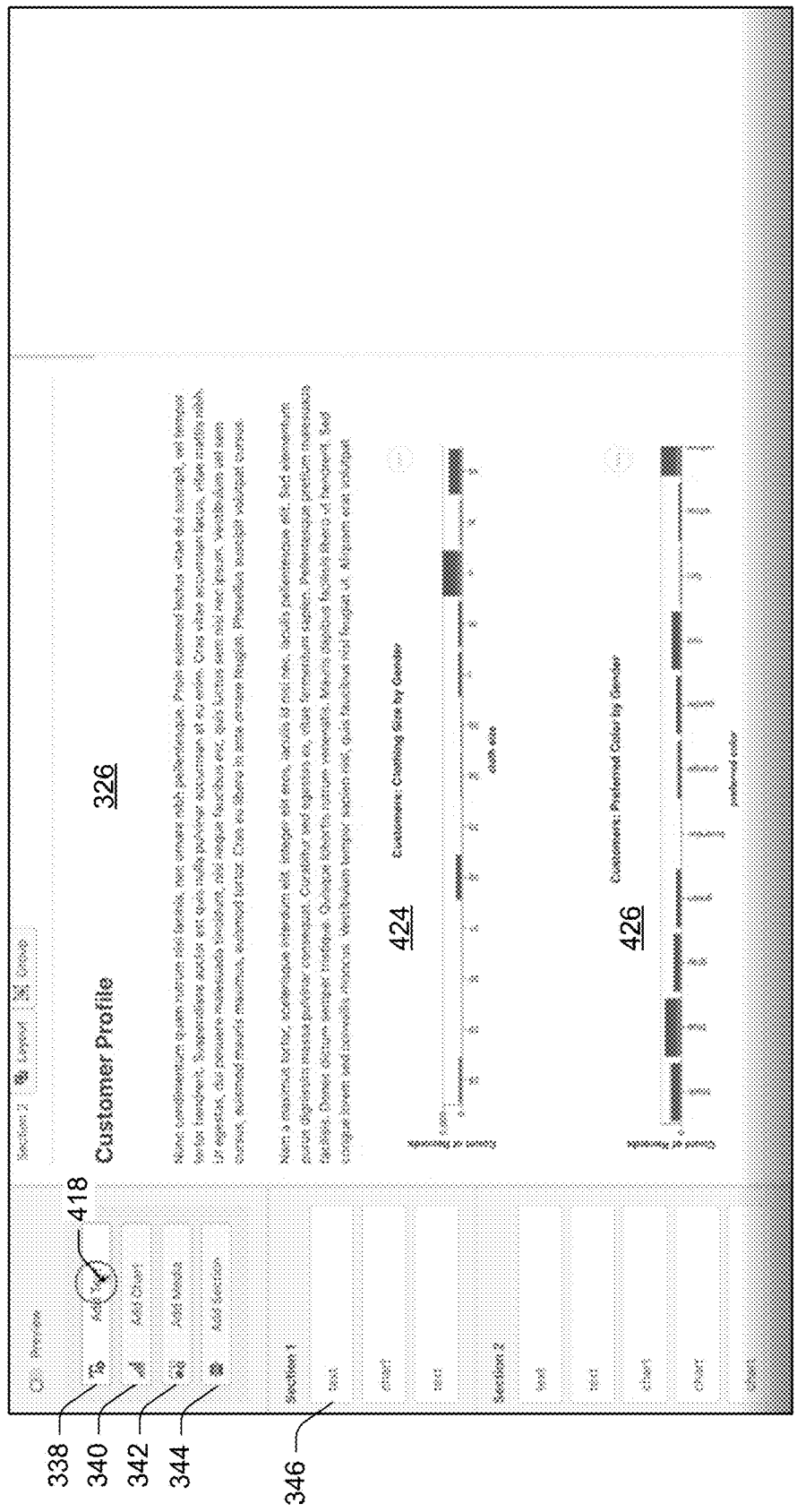
Figure 4D:
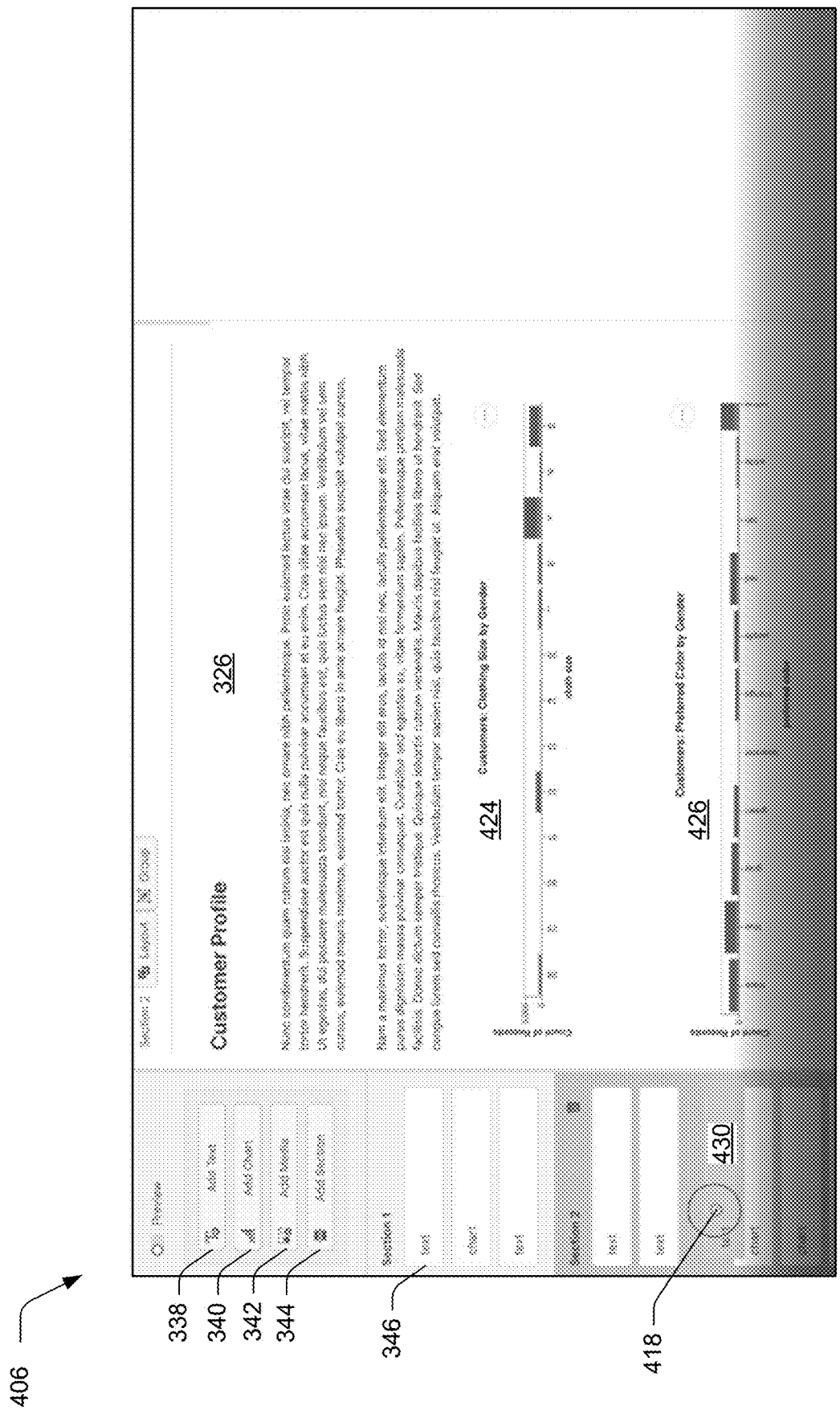
Figure 4E:
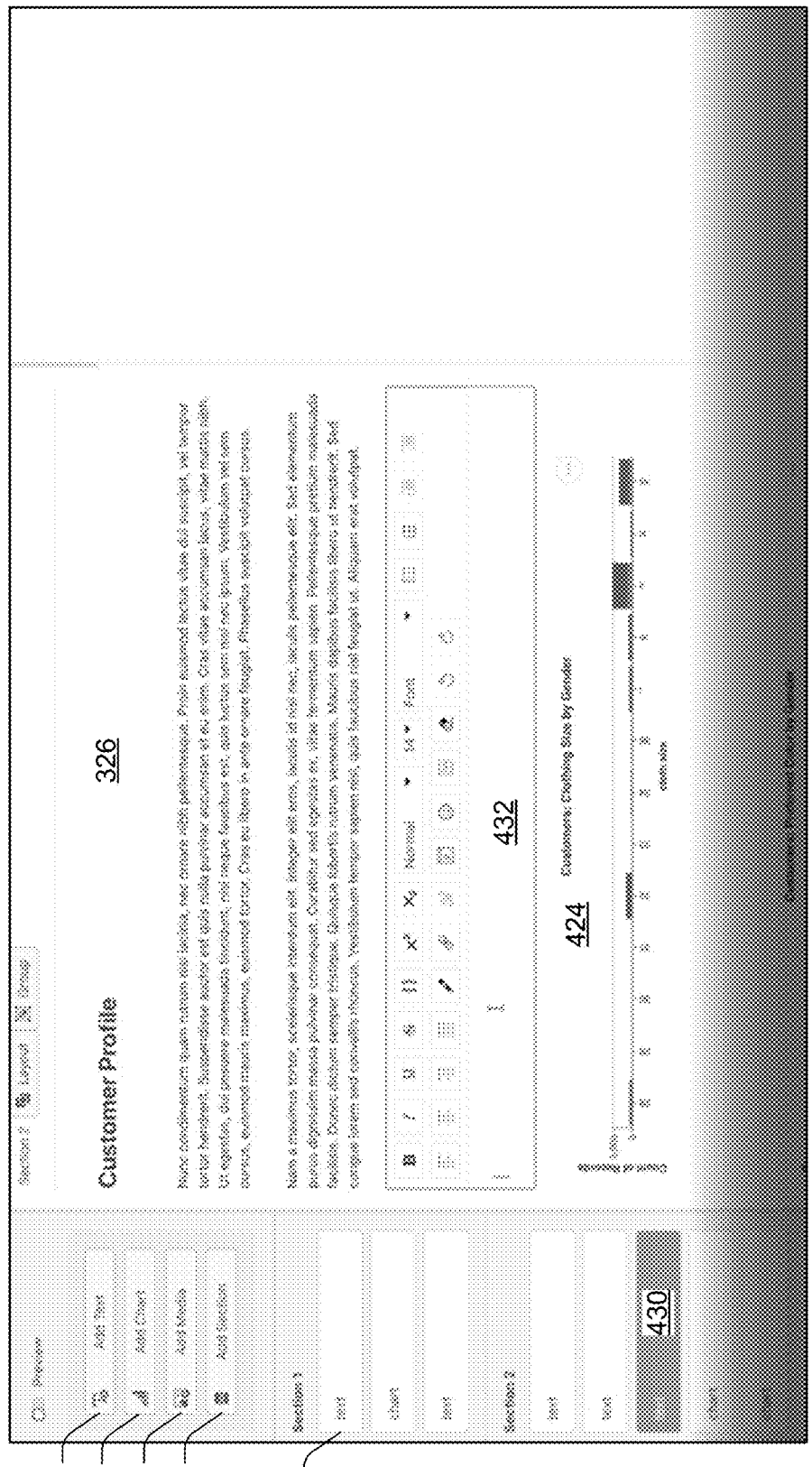
Figure 4J:
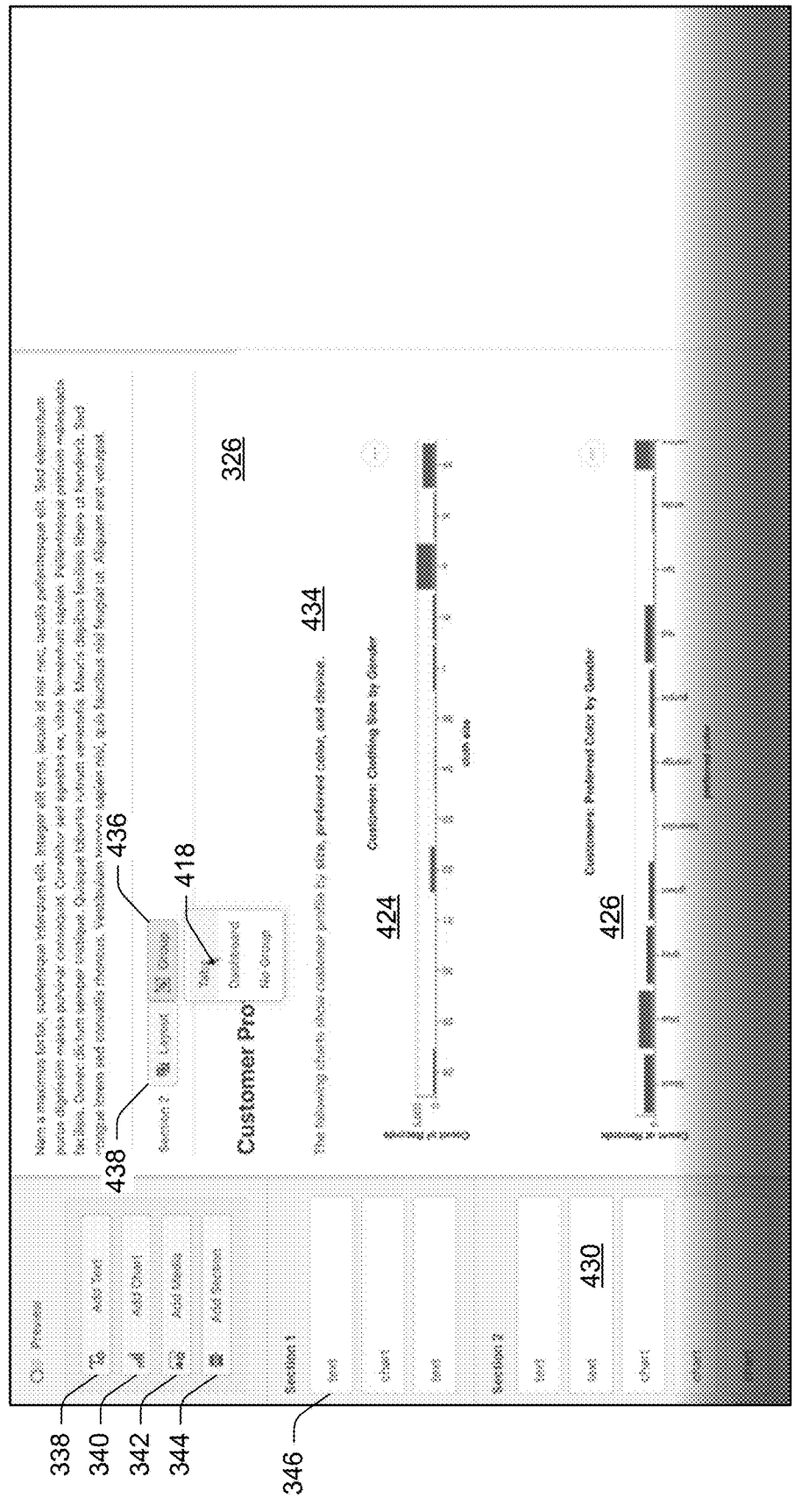
Figure 4G:
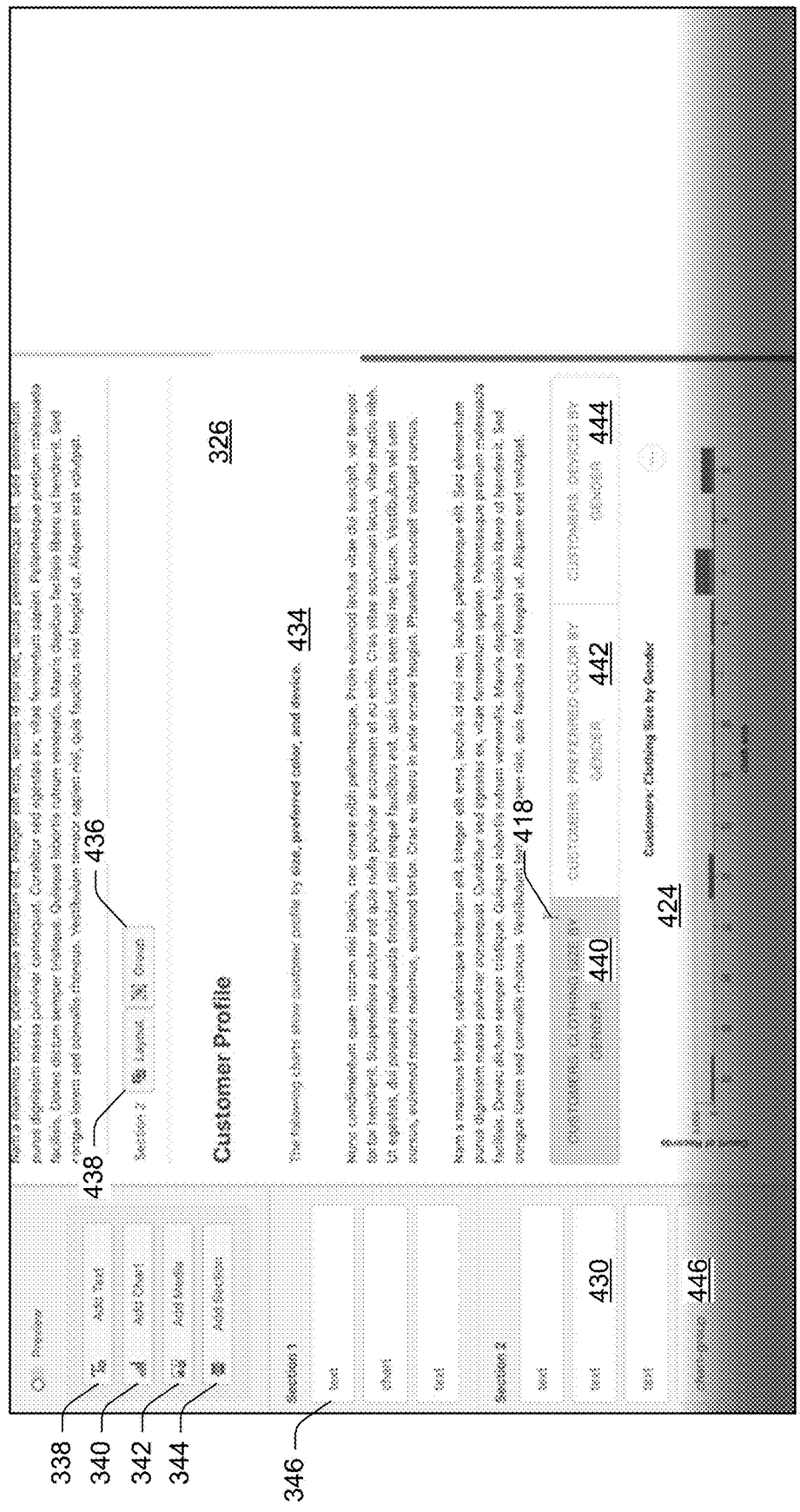
Figure 4A:
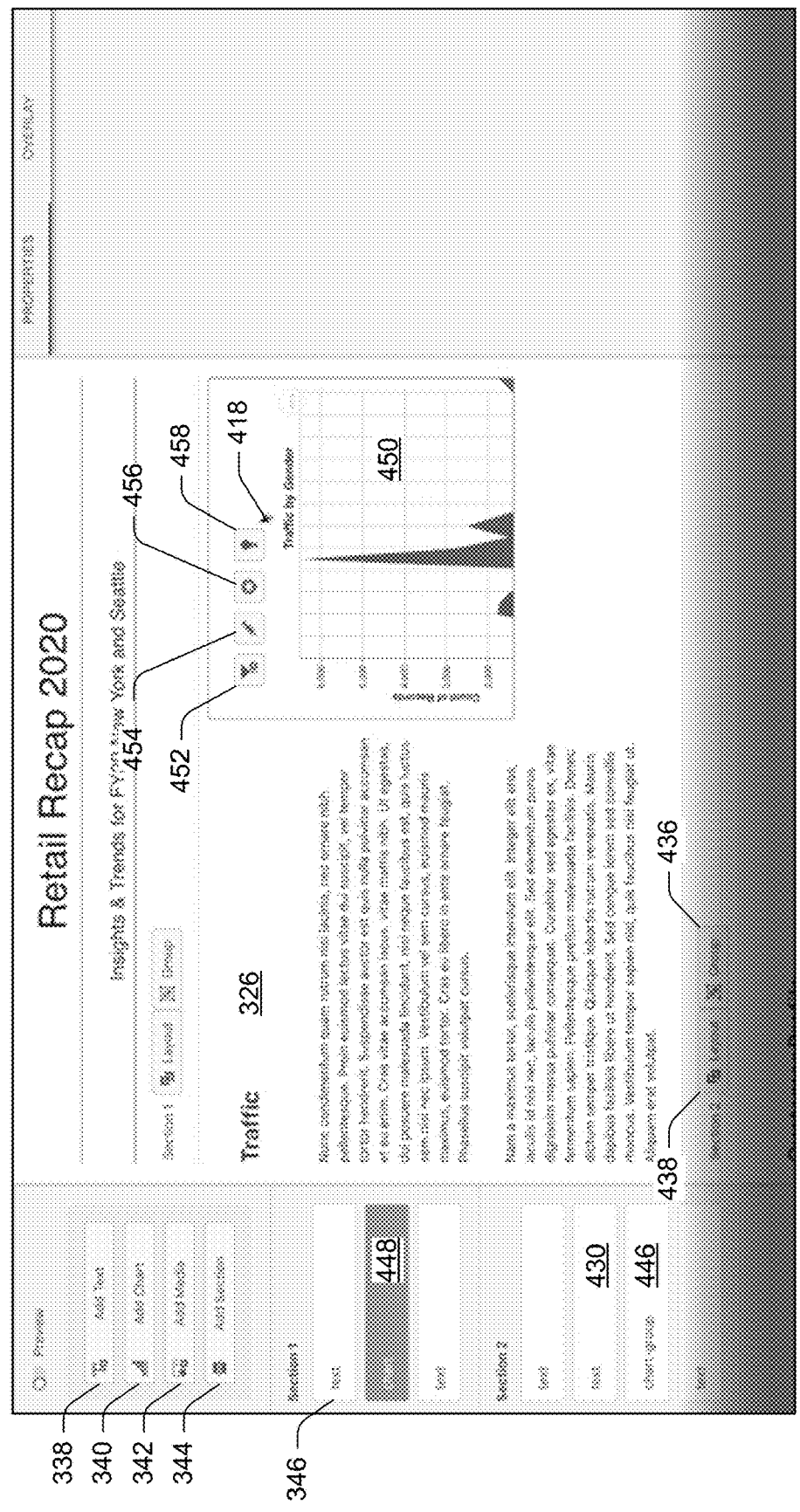
Figure 49:
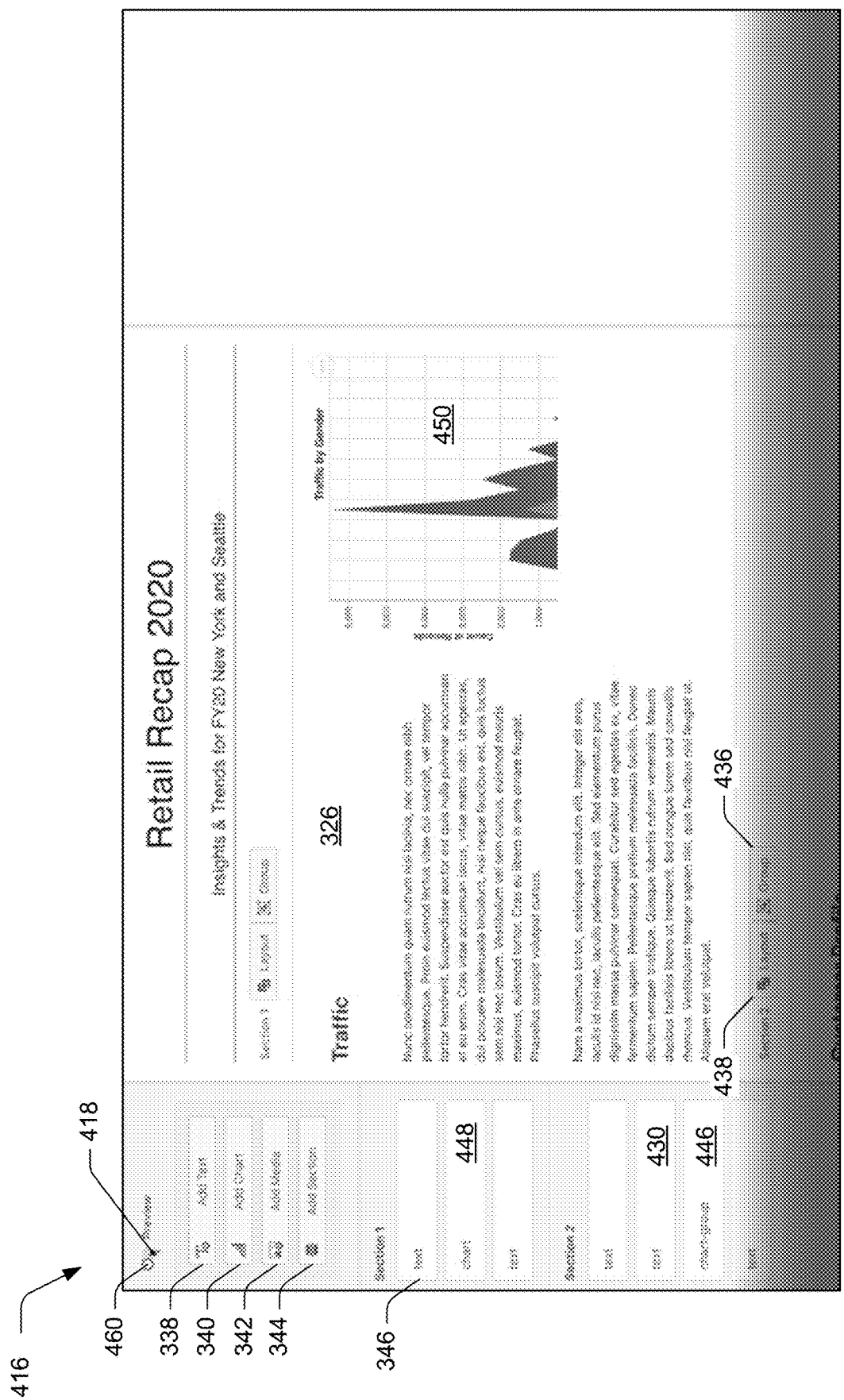

FIGS. 4A, 4B, 4C, 4D, 4E, 4F, 4G, 4H, and 4I illustrate examples of user inputs received specifying modifications to portions of analytics reports as part of generating an interactive report. FIG. 4A illustrates a representation 400 of displaying charts of an analytics report in an editing interface 120 based on a declarative specification that describes the analytics report in a language that encodes data as properties of graphic objects. FIG. 4B illustrates a representation 402 of receiving a user input selecting displayed charts of the analytics report for inclusion in an interactive report. FIG. 4C illustrates a representation 404 of an interaction with a user interface element in an editing panel of the editing interface 120. FIG. 4D illustrates a representation 406 of an interaction with a user interface element in an overview panel of the editing interface 120. FIG. 4E illustrates a representation 408 of a text editor interface for adding a narrative text to the interactive report. FIG. 4F illustrates a representation 410 of an interaction with a user interface element in a main panel of the editing interface 120. FIG. 4G illustrates a representation 412 of a modified grouping of charts included in the interactive report. FIG. 4H illustrates a representation 414 of interactive functionality addable to a chart of the interactive report. FIG. 4I illustrates a representation 416 of an interaction with a user interface element for previewing the interactive report.

As shown in FIG. 4A, the authoring module 204 uses the declarative specification 324 described by the pre-processed data 208 to display charts included in the analytics report 320 in the editing interface 120. The user interacts with the input device to manipulate a cursor 418 in the editing interface 120. For example, the user manipulates the input device to interact with the user interface element 340 in the editing panel 328 to request an addition of charts included in the analytics report 320 to the interactive report. In this example, the authoring module 204 receives the editing data 122 describing the interaction with the user interface element 340 and processes the editing data 122 to display the representation 400.

The representation 400 includes user interface elements 420, 422. For instance, the user manipulates the cursor 418 to cancel the requested addition of the charts to the interactive report. Alternatively, the user manipulates the input device to indicate which charts of the displayed charts to include in the interactive report, and then the user manipulates the input device to interact with the user interface element 422 to add any indicated charts to the interactive report. As shown, the user selects charts 424, 426 for inclusion in the interactive report.

As illustrated in FIG. 4B, the user also selects a chart 428 in addition to the charts 424, 426, and then the user manipulates the cursor 418 to interact with the user interface element 422 which includes the charts 424-428 in the interactive report. The authoring module 204 receives the editing data 122 describing the addition of the charts 424-428 to the interactive report. In response to receiving the editing data 122, the authoring module 204 modifies the declarative specification 324 and/or generates a modified declarative specification that describes the interactive report.

For example, the modified declarative specification includes portions of the declarative specification 324 that describe the selected charts 424-428 but does not include portions of the declarative specification 324 describing charts displayed in the representation 400 which were not selected for inclusion in the interactive report. In this example, the authoring module 204 maintains the declarative specification 324 which describes all of the charts included in the analytics report 320 in addition to maintaining the modified declarative specification which describes the interactive report including the charts 424-428. In an example in which the authoring module 204 receives the editing data 122 describing an additional interaction with the user interface element 340, the authoring module 204 uses the maintained declarative specification 324 to display the representation 400.

FIG. 4C depicts a portion of the editing interface 120 which includes a portion of the main panel 326. The chart 424 and the chart 426 are included in the main panel 326 which indicates that the charts 424, 426 are also included in the interactive report. The user interacts with the input device and manipulates the cursor 418 in the editing interface 120 to add a narration or a narrative text to the interactive report by interacting with the user interface element 338. For example, the authoring module 204 receives the editing data 122 which describes the user's interaction with the user interface element 338.

With reference to FIG. 4D, and in response to receiving the editing data 122, the authoring module 204 displays a new user interface element 430 in the overview panel 330 of the editing interface 120. The new user interface element 430 represents an added narrative text to the interactive report and the user manipulates the input device to interact with the new user interface element 430. For example, the overview panel 330 includes Section 1 and Section 2 which correspond to first and second sections of the interactive report, respectively.

The authoring module 204 initially displays the new user interface element 430 in Section 1 in the overview panel 330. As shown, the user interacts with the new user interface element 430 by moving the new user interface element 430 into Section 2 in the overview panel 330 which causes the added narrative text to be disposed in the second section of the interactive report. For instance, the authoring module 204 receives the editing data 122 describing the user's interactions with the new user interface element 430 and the authoring module 204 further modifies or updates the modified declarative specification to include a description of the added narrative text in the second section of the interactive report.

For example, as the user interacts with the input device to modify portions of the analytics report 320 in the editing interface 120, the authoring module 204 updates the modified declarative specification using the language that encodes data as properties of graphic objects to include modifications performed in the editing interface 120. The representation 408 depicted in FIG. 4E includes a text editor interface 432 for creating and/or editing the added narrative text. The text editor interface 432 is disposed in Section 2 of the main panel 326 and the user interacts with the input device to specify a substance of the added narrative text and/or specify a visual appearance of the added narrative text.

An example 434 of the added narrative text is illustrated in FIG. 4F. As shown, the example 434 is disposed in Section 2 of the main panel 326 and includes a substance of "The following charts show customer profile by size, preferred color, and device." The example 434 includes a visual appearance such that the words "size, preferred color, and device" are rendered using a bold font. For instance, the user has disposed the new user interface element 430 above a user interface element that represents the chart 424 in the overview panel 330. Because of this, the example 434 is disposed above the chart 424 in the main panel 326.

In the representation 410, the main panel 326 includes user interface elements 436, 438 and the user interacts with the input device to manipulate the cursor 418 in the editing interface 120 to interact with user interface element 436. For example, user interface element 438 is usable to modify a layout of the charts 424, 426 in the main panel 326. As shown, the user interacts with the user interface element 436 to modify a grouping of the charts 424-428 in the main panel 326. In this example, the user manipulates the cursor 418 in the editing interface 120 to indicate a multi-view grouping by selecting "Tabs" in a grouping menu displayed in the main panel 326.

The authoring module 204 receives the editing data 122 which describes the indicated multi-view grouping for the charts 424-428 in the interactive report. In response to receiving the editing data 122, the authoring module 204 updates the modified declarative specification to include a description of the multi-view grouping for the charts 424-428. By updating the modified declarative specification in this manner, the authoring module 204 ensures that the modified declarative specification is usable to generate and display the interactive report based on the user's modifications to the portions of the analytics report 320. For example, modified declarative specification is usable to render the representation 412 depicted in FIG. 4G.

As shown, the charts 424-428 are now represented as tabs 440-444 of the multi-view grouping and a new user interface element 446 is included in the overview panel 330 which represents the multi-view grouping. For instance, tab 440 corresponds to the chart 424; tab 442 corresponds to the chart 426; and tab 444 corresponds to the chart 428. The user interacts with the input device to manipulate the cursor 418 in the editing interface 120 to select the tab 440 which displays the chart 424 in the multi-view grouping. For example, a selection of the tab 442 replaces the chart 424 with the chart 426 and a selection of the tab 444 replaces the chart 424 with the chart 428 in the multi-view grouping.

With respect to FIG. 4H, the user manipulates the input device to interact with the user interface element 340 and the authoring module 204 uses the maintained declarative specification 324 to display the representation 400. As shown in the representation 414, a new user interface element 448 is included in the overview panel 330 which represents a new chart 450 that is included in the main panel 326. The user interacts with the input device to manipulate the cursor 418 in the editing interface 120 to add interactive functionality to the new chart 450 through interaction with user interface elements 452-458.

For example, the user interacts with user interface element 452 to add an interactive filter to the new chart 450; user interface element 454 to add an annotation or a narrative text to the new chart 450; user interface element 456 to add an overlay to the new chart 450; and/or user interface element 458 to add an interactive highlight to the new chart 450. The authoring module 204 receives the editing data 122 describing the added interactive functionality to the new chart 450. In response to receiving the editing data 122, the authoring module 204 updates the modified declarative specification using the language that encodes data as properties of graphic objects to add a description of the added interactive functionality to the new chart 450.

As shown in FIG. 4I, the user interacts with the input device to manipulate the cursor 418 in the editing interface 120 to interact with a preview user interface element 460. The authoring module 204 receives the editing data 122 describing the interaction with the preview user interface element 460. In response to receiving the editing data 122, the authoring module 204 generates the modified data 210 as describing the updated modified declarative specification in the language that encodes data as properties of graphic objects. With respect to FIG. 2, the display module 206 receives the modified data 210 and the display module 206 processes the modified data 210 to display the interactive report.

Figure 5:
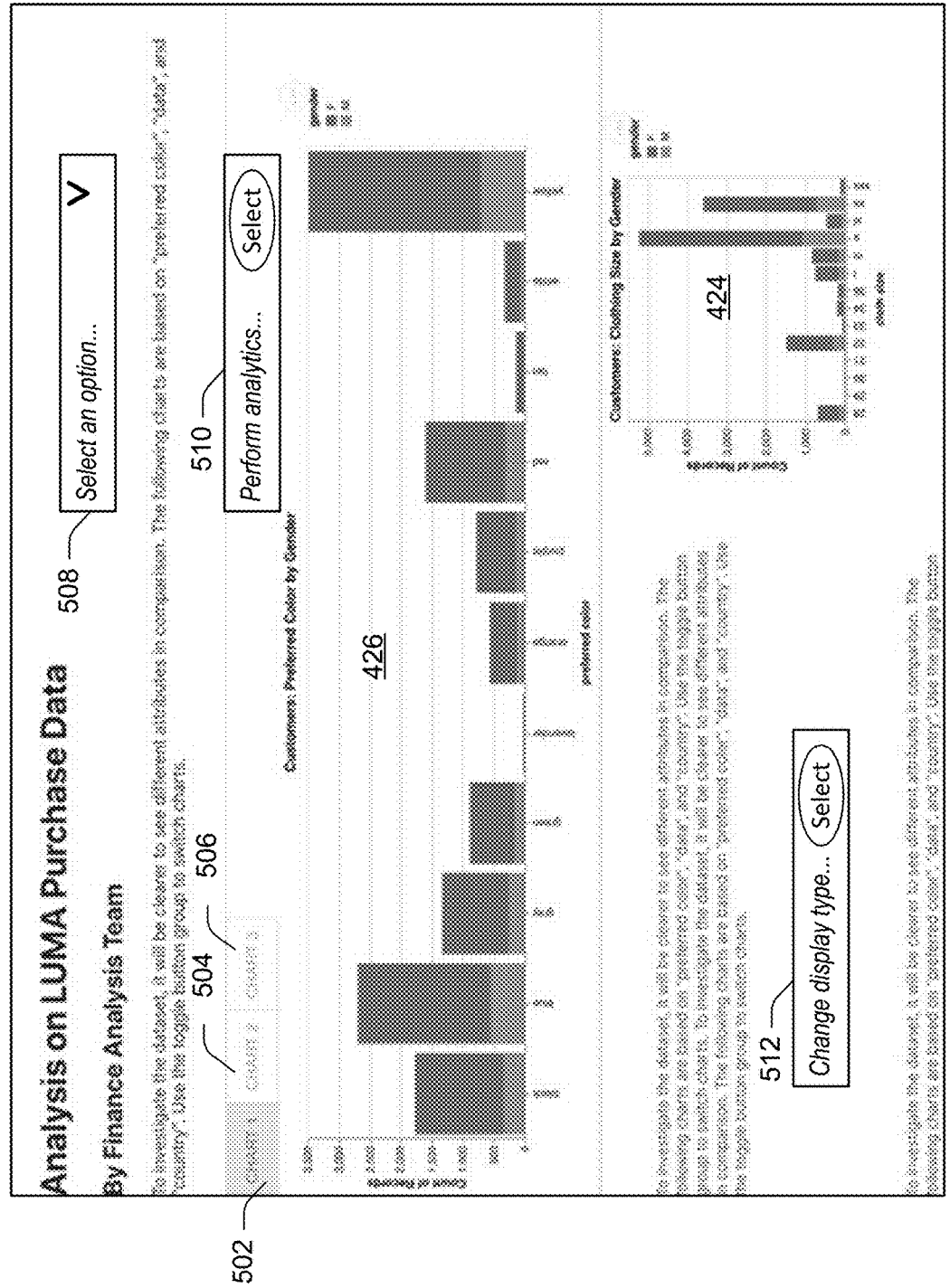
FIG. 5 illustrates a representation of a generated interactive report.

FIG. 5 illustrates a representation 500 of a generated interactive report. In one example, the display module 206 generates the interactive report in a hypertext markup language (HTML) format. In other examples, the display module 206 is capable of generating the interactive report in a variety of different formats such as formats which are compatible with the analytics platforms 308, 310. As shown, the interactive report includes interactive tabs 502-506 which are selectable to display subsets of the charts 424-428. In the illustrated example, tab 502 is selected to display the chart 426 in the interactive report. The chart 424 is also displayed in the interactive report but with reduced dimensions relative to the chart 426 to indicate that information conveyed by the chart 424 is less important than information conveyed by the chart 426.

Each of the charts 424, 426 depicts a result of analytics performed on the dataset 306. For instance, the chart 426 is titled "Preferred Color by Gender" and includes graphical elements which indicate counts of records for 11 different colors. These graphical elements are multi-colored to indicate counts of the records by gender for each of the 11 different colors. As illustrated in FIG. 5, the chart 424 is titled "Clothing Size by Gender" and includes different graphical elements that indicate counts of records for 14 different clothing sizes. Like the graphical elements depicted in the chart 426, the different graphical elements are also multi-colored to indicate counts of the records by gender for each of the 14 different clothing sizes.

The interactive report also includes an interactive filter 508 with selectable filter options. A first selectable filter option of the interactive filter 508 removes a portion of the result of analytics performed on the dataset 306 from the chart 426. For example, the first selectable filter option removes a colored portion of the graphical elements corresponding to one of the genders or removes graphical elements corresponding to colors lavender, tan, and white from the chart 426.

A second selectable filter option of the interactive filter 508 adds an additional result of analytics performed on the dataset 306 to the chart 426. In an example, the second selectable filter option adds additional graphical elements to the chart 426 that indicate counts of records for additional colors or adds graphical elements to the chart 426 that indicate counts of records for clothing having more than one color. Consider an example in which it is desirable to add a new result of additional analytics performed on the dataset 306 to the chart 426 and this new result is not included in the analytics report 320. In this example, the interactive report includes an analytics tool 510 usable to perform the additional analytics on the dataset 306 to generate the new result. Once generated, the new result is added to the chart 426 automatically in one example.

Continuing the previous example, after adding the new result of the additional analytics to the chart 426, an amount of information conveyed in the interactive report causes a manner in which the information is displayed to be undesirable. In this example, the interactive report includes a user interface element 512 that is usable to change the manner in which the information is displayed in the interactive report. For example, the user interface element 512 is usable to remove the new result of the additional analytics from the chart 426, remove the chart 424 from the interactive report, change a grouping of the charts 424-428, change a layout of the interactive report, and so forth.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 6:
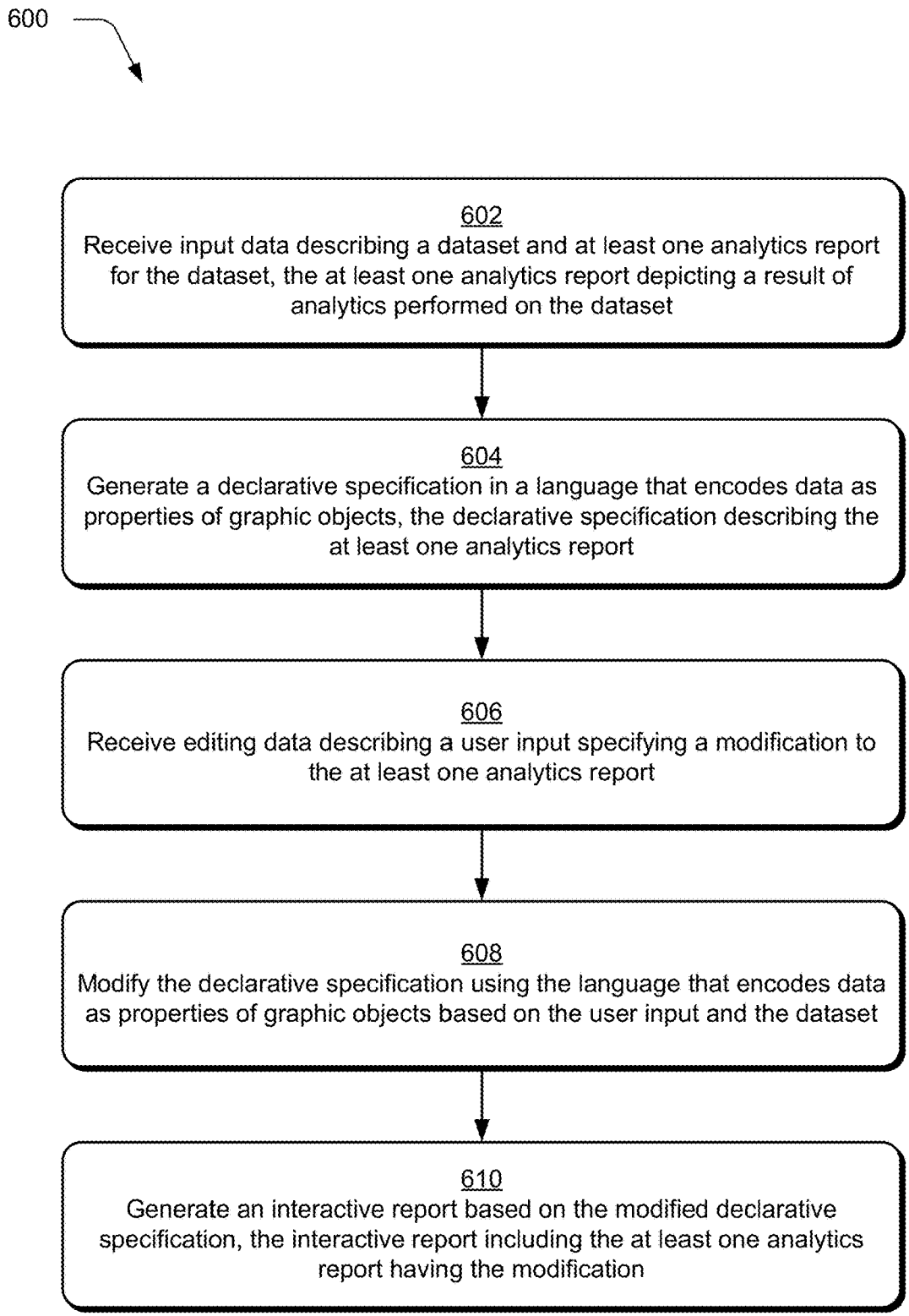
FIG. 6 is a flow diagram depicting a procedure in an example implementation in which input data is received and an interactive report is generated.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which input data is received and an interactive report is generated. Input data is received describing a dataset and at least one analytics report for the dataset (block 602), the at least one analytics report depicts a result of analytics performed on the dataset. In one example, the computing device 102 implements the report module 110 to receive the input data.

A declarative specification is generated in a language that encodes data as properties of graphic objects (block 604), the declarative specification describes the at least one analytics report. For example, the report module 110 generates the declarative specification in the language that encodes data as properties of graphic objects. Editing data is received describing a user input specifying a modification to the at least one analytics report (block 606). The computing device 102 implements the report module 110 to receive the editing data in an example.

The declarative specification is modified using the language that encodes data as properties of graphic objects based on the user input and the dataset (block 608). In an example, the report module 110 modifies the declarative specification based on the user input and the dataset. An interactive report is generated based on the modified declarative specification (block 610), the interactive report includes the at least one analytics report having the modification. For example, the computing device 102 implements the report module 110 to generate the interactive report.

Figure 7:
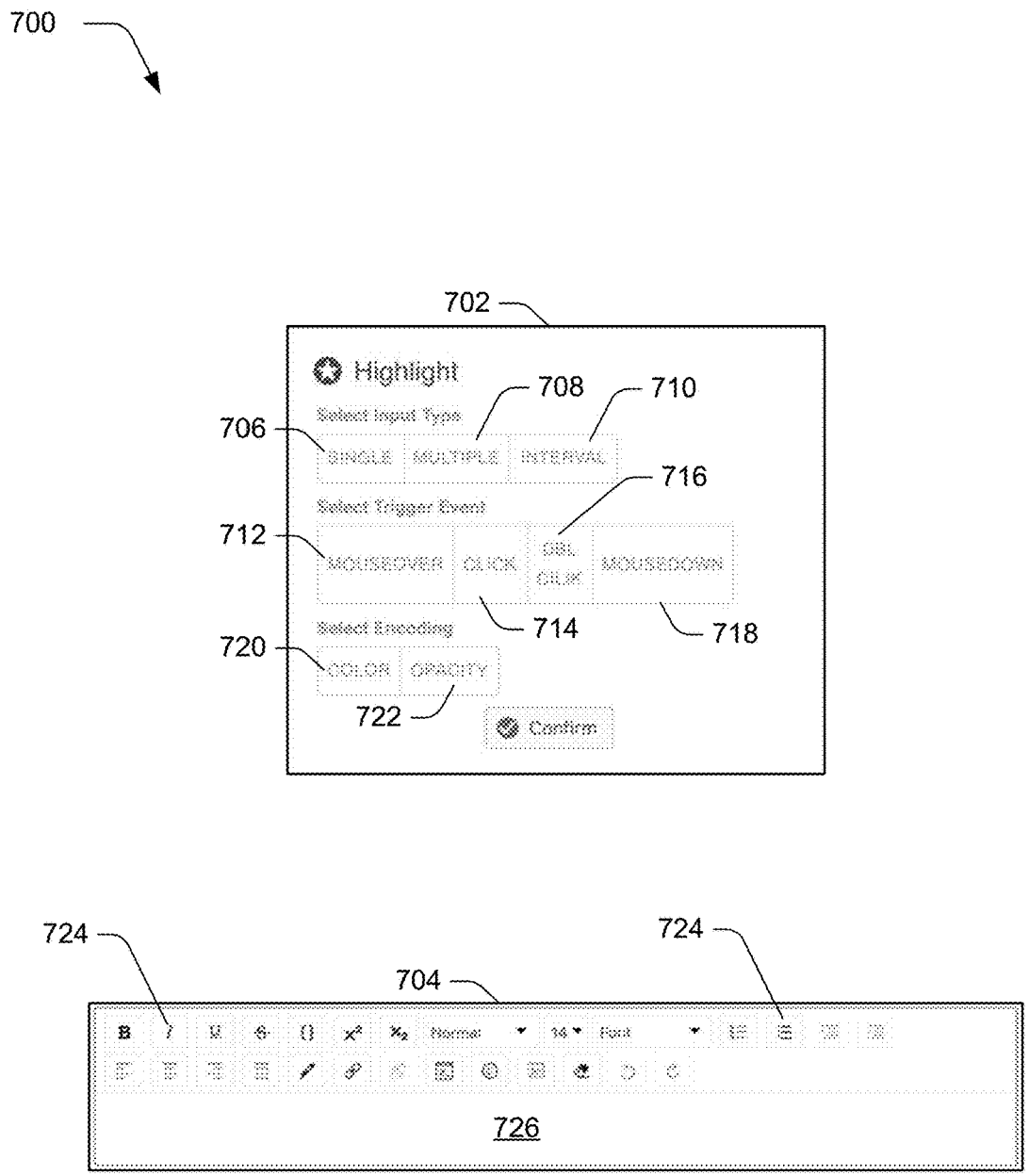
FIG. 7 illustrates an example representation of user interfaces for annotating analytics reports.

FIG. 7 illustrates an example representation 700 of user interfaces for annotating analytics reports. As shown, the representation 700 includes a highlight addition interface 702 and a text editor interface 704. The highlight addition interface 702 includes user interface elements 706-710 for specifying an input type. For instance, the user manipulates the input device to interact with user interface element 706 to specify a single input type; user interface element 708 to specify a multiple input type; or user interface element 710 to specify an interval input type.

The highlight addition interface 702 also includes user interface elements 712-718 for specifying a trigger event. For example, an interaction with user interface element 712 specifies a mouseover trigger event; an interaction with user interface element 714 specifies a click trigger event; an interaction with user interface element 716 specifies a double click trigger event; and an interaction with user interface element 718 specifies a mousedown trigger event. Finally, the highlight addition interface 702 includes user interface elements 720, 722 for specifying an encoding. As shown, an interaction with user interface element 720 specifies a color encoding and an interaction with user interface element 722 specifies an opacity encoding.

The text editor interface 704 includes editing tools 724 and an input field 726. For example, the user manipulates the input device to select the input field 726 and then further manipulates the input device (or another input device) to enter text in the input field 726. An interaction with one the editing tools 724 changes a visual appearance of text entered in the input field 726. For instance, the editing tools 724 are usable to change a font used to render text in the input field 726, change size of text in the input field 726, change a color of text in the input field 726, and so forth.

Figure 8:
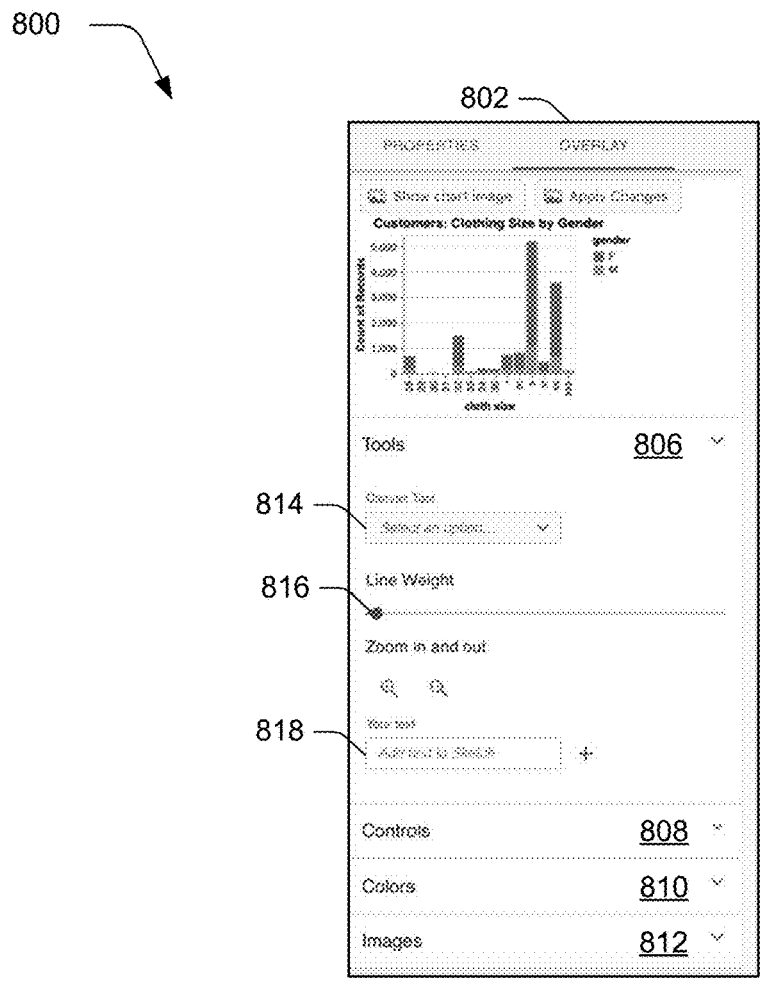
FIG. 8 illustrates an example representation of user interfaces for modifying analytics reports.

FIG. 8 illustrates an example representation 800 of user interfaces for modifying analytics reports. The representation 800 includes an overlay addition interface 802 and a filter addition interface 804. The overlay addition interface 802 includes menus 806-812. For example, an interaction with menu 806 displays overlay tools such as a canvas tool 814, a line weight tool 816, a text tool 818, etc. An interaction with menu 808 displays overlay controls; and interaction with menu 810 displays overlay colors; and an interaction with menu 812 displays overlay images.

The filter addition interface 804 includes a menu 820 for specifying data to filter out from a chart associated with an interactive filter and/or data to add to the chart associated with the interactive filter. As shown, the filter addition interface 804 also includes user interface elements 822-826 for specifying an input type. For example, an interaction with user interface element 822 specifies a checkbox input; an interaction with user interface element 824 species a radio input; an interaction with user interface element 826 specifies a range input; and an interaction with user interface element 828 specifies a selectable input. Finally, the filter addition interface 804 includes user interface element 830 for specifying a color filter type and user interface element 832 for specifying an opacity filter type.

Example System and Device

Figure 9:
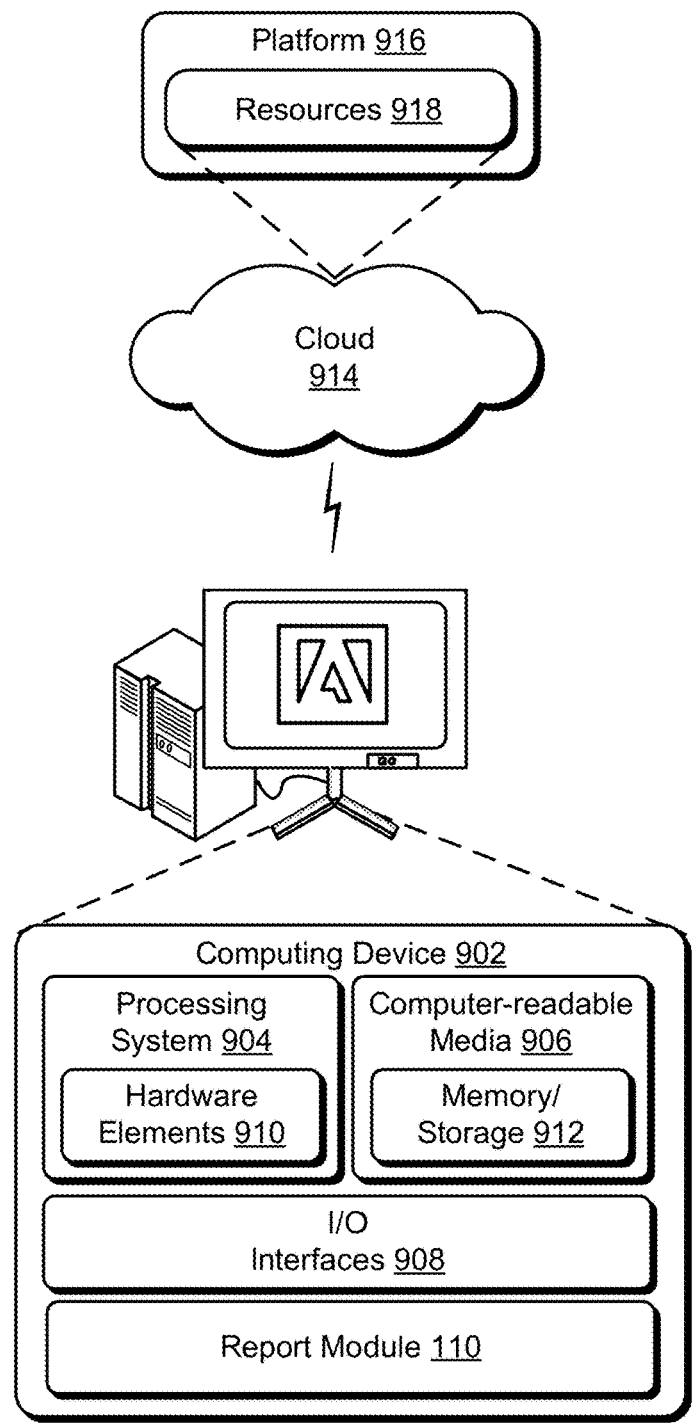
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the report module 110. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

Conclusion

Although implementations of systems for generating interactive reports have been described in language specific to structural features and/or methods, it is to be understood that the appended claims are not necessarily limited to the specific features or methods described. Rather, the specific features and methods are disclosed as example implementations of systems for generating interactive reports, and other equivalent features and methods are intended to be within the scope of the appended claims. Further, various different examples are described and it is to be appreciated that each described example is implementable independently or in connection with one or more other described examples.

What is claimed is:

1. In a digital medium environment, a method implemented by a computing device, the method comprising:
receiving, by the computing device, input data describing a dataset and at least one analytics report for the dataset, the at least one analytics report depicting a result of analytics performed on the dataset;
converting, by the computing device, the input data into a uniform format;
generating, by the computing device, using the input data in the uniform format, a declarative specification in a language that encodes data as properties of graphic objects, the declarative specification describing the at least one analytics report;
receiving, by the computing device, editing data describing a user input specifying a modification to the at least one analytics report;
modifying, by the computing device, the declarative specification using the language that encodes data as properties of graphic objects based on the user input and the dataset; and
generating, by the computing device, an interactive report based on the modified declarative specification, the interactive report including the at least one analytics report having the modification.

2. The method as described in claim 1, wherein the modification is an interactive filter and an interaction with the interactive filter removes a portion of the result of analytics performed on the dataset from the at least one analytics report.

3. The method as described in claim 1, wherein the modification is a narration, a highlight, a tooltip, or an overlay.

4. The method as described in claim 1, wherein the modification is a layout.

5. The method as described in claim 1, wherein the modification is a grouping of the at least one analytics report and an additional analytics report, the additional analytics report depicting an additional result of analytics performed on the dataset.

6. The method as described in claim 5, wherein the at least one analytics report is generated using a first analytics platform to process the dataset and the additional analytics report is generated using a second analytics platform to process the dataset.

7. The method as described in claim 1, wherein the modification is based at least partially on a result of analytics performed on an additional dataset described by the input data.

8. The method as described in claim 1, further comprising:
processing the at least one analytics report described by the input data using a machine learning model trained on training data to receive analytics reports and generate declarative specifications describing the analytics reports in the language that encodes data as properties of graphic objects; and
outputting, by the machine learning model, the declarative specification describing the at least one analytics report.

9. The method as described in claim 1, wherein the at least one analytics report is a digital image.

10. A system comprising:
a pre-processing module implemented at least partially in hardware of a computing device to:
receive input data describing a dataset and at least one analytics report for the dataset, the at least one analytics report depicting a result of analytics performed on the dataset;
convert the input data into a uniform format; and
generate, using the input data in the uniform format, a declarative specification in a language that encodes data as properties of graphic objects,
the declarative specification describing the at least one analytics report;
an authoring module implemented at least partially in the hardware of the computing device to:
receive editing data describing a user input specifying a modification to the at least one analytics report; and
modify the declarative specification using the language that encodes data as properties of graphic objects based on the user input and the dataset; and
a display module implemented at least partially in the hardware of the computing device to generate an interactive report based on the modified declarative specification, the interactive report including the at least one analytics report having the modification.

11. The system as described in claim 10, wherein the modification is an interactive filter and an interaction with the interactive filter removes a portion of the result of analytics performed on the dataset from the at least one analytics report.

12. The system as described in claim 10, wherein the modification is a highlight, a layout, an overlay, or an addition of digital content.

13. The system as described in claim 10, wherein the modification is a tooltip.

14. The system as described in claim 10, wherein the modification is a grouping of the at least one analytics report and an additional analytics report, the additional analytics report depicting an additional result of analytics performed on the dataset.

15. The system as described in claim 10, wherein the modification is based at least partially on a result of analytics performed on an additional dataset described by the input data.

16. One or more computer-readable storage media comprising instructions stored thereon that, responsive to execution by a computing device, causes the computing device to perform operations including:
receiving input data describing a dataset and at least one analytics report for the dataset, the at least one analytics report depicting a result of analytics performed on the dataset;
converting the input data into a uniform format;
generating, using the input data in the uniform format, a declarative specification in a language that encodes data as properties of graphic objects, the declarative specification describing the at least one analytics report;
receiving editing data describing a user input specifying a modification to the at least one analytics report;
modifying, automatically and without user intervention, the declarative specification using the language that encodes data as properties of graphic objects based on the user input and the dataset; and generating an interactive report based on the modified declarative specification, the interactive report including the at least one analytics report having the modification.

17. The one or more computer-readable storage media as described in claim 16, wherein modification is based at least partially on a result of analytics performed on an additional dataset described by the input data.

18. The one or more computer-readable storage media as described in claim 16, wherein the operations further include:
processing the at least one analytics report described by the input data using a machine learning model trained on training data to receive analytics reports and generate declarative specifications describing the analytics reports in the language that encodes data as properties of graphic objects; and
outputting, by the machine learning model, the declarative specification describing the at least one analytics report.

19. The one or more computer-readable storage media as described in claim 16, wherein the modification is a grouping of the at least one analytics report and an additional analytics report, the additional analytics report depicting an additional result of analytics performed on the dataset.

20. The one or more computer-readable storage media as described in claim 16, wherein the modification is an interactive filter and an interaction with the interactive filter removes a portion of the result of analytics performed on the dataset from the at least one analytics report.

* * * * *